United States Patent [19]
Kurita et al.

[11] Patent Number: 5,970,511
[45] Date of Patent: Oct. 19, 1999

[54] INFORMATION PROVIDING SYSTEM

[75] Inventors: Hideko Kurita; Koji Hatano, both of Tokyo, Japan

[73] Assignee: Matsushita Electric Industrial Co., Ltd., Osaka, Japan

[21] Appl. No.: 08/877,580

[22] Filed: Jun. 17, 1997

[30] Foreign Application Priority Data

Jun. 17, 1996 [JP] Japan .................................. 8-155152

[51] Int. Cl.[6] .................................................. G06F 12/00
[52] U.S. Cl. .......................................................... 711/202
[58] Field of Search ............................................ 711/202

[56] References Cited

U.S. PATENT DOCUMENTS 5,634,002  5/1997  Polk et al. .

FOREIGN PATENT DOCUMENTS 6-102888  4/1994  Japan .

Primary Examiner—Jack A. Lane
Attorney, Agent, or Firm—Lowe Hauptman Gopstein Gilman & Berner

[57] ABSTRACT

To provide detailed information with large amount of data without changing the information to be provided by considering environment of users on information server side providing information and without increasing data amount of the information sent to an information terminal from the information server, and also to facilitate referring, setting and updating of the information of a portable storage medium when the portable storage medium is used as local information storage means. Information is provided to the users by referring to conversion information, which indicates a conversion object address expressing storage status of a given information, which is to be a conversion object, and a conversion candidate address expressing storage status of an information corresponding to said given information, which is to be a conversion candidate, and conversion relationship between said two addresses.

19 Claims, 26 Drawing Sheets

FIG. 6
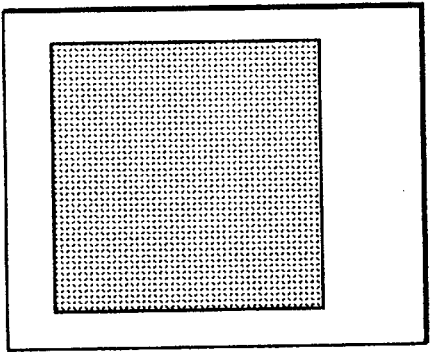
A "<img src=http://farhostB/bbb.gif>"
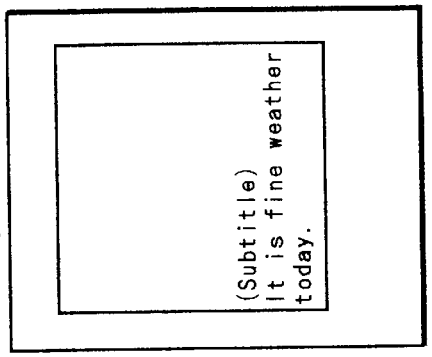
B "<img src=http://nearhostX/ccc.jpg>"
FIG. 7
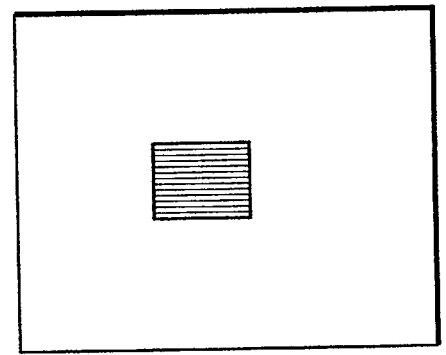
A "<img src=http://farhostC/ddd.gif>"
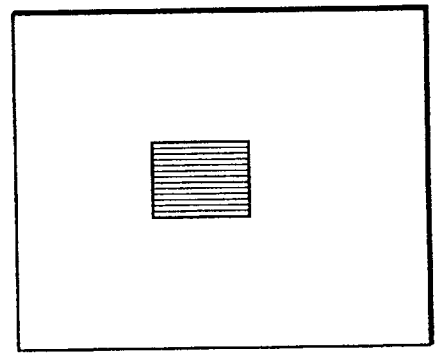
B "<video src=http://nearhostY/eee.mpg txt=http://nearhostZ/fff.txt>"
(Subtitle)
It is fine weather today.

FIG. 8
"<img src=http://farhostC/ggg.gif>
<a href=http://farhostC/hhh.jpg>    </a>"
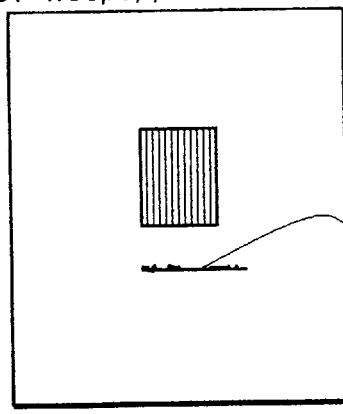
DETAILED IMAGE
B "<video src=http://nearhostZ/iii.jpg>"
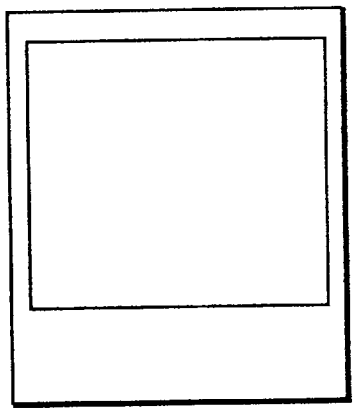
A' http://farhostC:/hhh.jpg on display
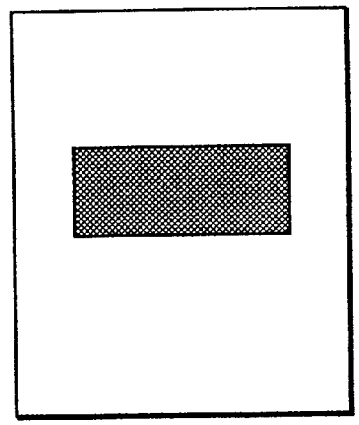

INFORMATION PROVIDING SYSTEM

BACKGROUND OF THE INVENTION

1. Field of the Invention

The present invention relates to an information providing system, which can replace an information to be displayed by other information and can acquire a new information from a portable medium and from a network when necessary and display it.

2. Description of the Related Art

When electronic information is presented, moving picture, detailed image or sound are indispensable for providing effective contents. In such information, however, there are problems in that amount of data extensively increases compared with the information which contains text only.

In the past, to acquire a part or all of large-scale information via a network and to perform processing to present it to users, the following methods have been used:

(1) To decrease amount of information according to transfer speed and to provide information at high speed;

(2) To adopt compression procedure;

(3) To provide contents with large amount of information over a long transfer time;

(4) To place only the contents having smaller amount of information on the network;

(5) To disperse data; or (6) To use cash.

Of the above methods, the following technique of karaoke system is known for the method (5): the technique disclosed in Japanese Patent Publication Laid-Open 6-102888. In this technique, data is dispersed and large-scale contents are locally maintained, and by clearly specifying which of the contents is to be presented via the network, moving pictures complying with the contents are provided even when lines are fine.

Description will be given below on arrangement and operation of a karaoke system using the above technique referring to FIG. 27. In FIG. 27, reference numeral 2700 represents a karaoke terminal, 2701 is music selecting means for specifying a desired music number by a user at the karaoke terminal, 2702 is image element pattern synthesizing means for providing an image in response to the request by combining image element pattern according to moving picture combining information, 2703 is image element pattern storage means to divide pattern to image elements and to control, 2704 is temporary storage means for storing information sent from local data base or primary information read from the image element pattern storage means, 2705 is reproducing and display means for reproducing and displaying by combining music data read from a local server with the image synthesized by the image element pattern synthesizing means, 2706 is communication means for sending a request number according to the request from the user and for receiving the corresponding music data and moving picture combining information, 2707 is central processing means for accepting the request from the user and for presenting the corresponding information, 2710 is a local data base, comprising music data storage means 2711, moving picture combining information storage means 2712, communication means 2713, and central processing means 2714, 2711 is music data storage means, 2712 is moving picture combining information storage means, 2713 is communication means, 2714 is central processing means for reading the corresponding music data to the request number received from the communication means 2713 from the music data storage means 2711, for reading the moving picture combining information from the moving picture combining information storage means 2712 corresponding to the request number and for sending it to the terminal, from which the request has been sent, using the communication means 2713.

When the user selects a request number of the desired music by operating the music selecting means 2701, the central processing means 2707 transmits the specified request number to a predetermined local data base using the communication means 2706.

The local data base 2710 accepts this request and sends back a command signal to combine music data corresponding to the request with moving pictures.

The terminal 2700 stores a command signal to combine music data with moving picture at primary storage means 2704.

Next, the terminal 2700 reads the music data from the primary storage means 2704 and reproduces it using the reproducing and display means 2705 and reads an image element pattern from the image element pattern storage means 2703 based on the received moving picture combining command signal. Then, this is synthesized by the image element pattern synthesizing means 2702. The synthesized image is reproduced via the reproducing and display means 2705.

As described above, when the technique of Japanese Patent Publication Laid-Open 6-102888 is used, it is possible to provide information of large capacity to match the request of the user without transferring large capacity information via the network. This is attained by sending the information for reproducing the contents at hand of the user in response to the request of the user on the server side and by presenting image information according to the information on the terminal side.

In a system for reading and displaying information via a network, e.g. browser of WorldWideWeb, the information once read is stored in local storage means, and for the second time and after, the local storage means is referred (6) in many cases. This method is provisionally called "cash utilizing method" hereinafter.

Description will be given now on an arrangement of an information providing system using the cash utilization method, referring to FIG. 28.

In FIG. 28, reference numeral 2800 represents an information terminal, 2801 is input means for specifying storage site of an information necessary for the user, 2802 is corresponding information storage means for matching and storing the storage site of a remote information with the storage site of the information in the information storage means, 2803 is data storage means for storing an information read form a remote place, 2804 is display means, 2805 is communication means, by which the information terminal exchanges information via a network, 2806 is central processing means for acquiring the information specified by the input means 2801 from the corresponding information storage means 2802 if it is available at the corresponding information storage means 2802, and, if not available, for reading and displaying the information from a specified place, 2810 is a network for connecting the information terminal 2800 with one or more information servers, 2820 is an information server group connected to the network 2810, reference numerals 2821, 2825, 2826 and 2827 each represents an information server included in the information server group 2820, 2822 is data storage means where real entity of the information or a substantial information referred by the information server 2821 is stored, 2823 is communication means of the information server 2821, and 2824 is central processing means of the information server 2821.

Next, referring to FIG. 28, description will be given on operation of the information providing system in case the user acquires a certain information from the information server 2821.

When the user specifies the storage site of necessary information by the input means 2801, the central processing means 2806 checks whether this storage site agrees with the storage site of remote information (0 or more) stored in the corresponding information storage means 2802. Because the corresponding information is established after reading the information from remote place, the storage sites do not agree with each other in this case.

Next, the central processing means 2806 requests real entity of the information shown by the remote storage site to the information server 2821 having the information using the communication means 2805. The central processing means 2824 of the information server 2821 receives this request via the communication means 2823 and reads the real entity of the information specified from the data storage means 2822. The information thus read is transferred to the information terminal 2800 via the network 2810 using the communication means 2823.

The central processing means 2806 of the information terminal 2800 reads the real entity of the information from the communication means 2805 and stores the information in the data storage means 2803. Also, correspondence information is prepared, which relates the storage site of the remote information obtained with the storage site at the corresponding information storage means 2803, and this is registered at the corresponding information storage means 2802. The central processing means 2805 displays the information using the display means 2804.

Next, when the storage site of the same information is specified by the input means 2801, the central processing means 2806 checks whether this storage site agrees with the storage site of remote information of the corresponding information storage means 2802 or not. They agree with each other because the corresponding information is already registered. The central processing means 2806 reads the storage site of a conversion candidate of the corresponding information storage means 2802 and acquires the entity of the information from the corresponding data storage means 2803. The acquired information is displayed using the display means 2804.

As described above, in the information providing system based on the cash utilization method, when the entity of the information present at the information server 2821 is to be displayed, the entity of the information is read at local data storage means 2803 when the entity of the information is first transferred from the information server 2821. By relating the storage site of the information in the information server 2821 with the storage site of the information at the data storage means 2803, there is no need to acquire the same information via the network in the second time and after, and this makes it possible to eliminate the time required for transfer before displaying the information.

In the methods (1) to (4) as described above, when large-scale information such as moving pictures is to be sent via the network, much time is required for the transfer of information because lines used for transfer are much finer compared with size of information, and the information cannot be presented at once.

Also, it is necessary that the server knows in advance what information is present at the user who requested the information, and this is a transaction in a closed network where a specific user is recognized by the server and a special-purpose program is offered.

In the hash utilization method of (6) above, it is necessary to read the information first via the network and to store it in a local storage medium for once, and it is not suitable for practical application to large-scale information such as motion picture.

Also, in the method of (6) above, the corresponding relation between the storage site of a remote information with the storage site of a local information is established after the entity of the information is transferred from the information server and is read in the local information storage means. This has the effect to reduce the time of transfer by eliminating repeated transfer of the same information, while it is not possible to define free corresponding relation such as the conversion of a request to a text in a remote information server to a request to moving picture present in a local storage medium.

In case it is described in a portable storage medium that information of which storage site should be re-read to information of which storage site, problem arises in that how the storage site of the information in the portable storage medium should be changed to an absolute path.

In the stage to distribute the portable storage media, only the path in the portable storage media can be described, while drive name is added to the path depending on the driving unit in a practical system.

In contrast, there is a method to add a drive name of the portable storage medium to the path in that portable storage medium in case software requiring the information including the storage site is installed. In such case, however, if another portable storage medium is present in the driving unit after the software has been installed and if it has similar file arrangement, what is originally different file may be erroneously referred to.

In a system where a plurality of driving units to match the same type of portable storage medium are present, drive name changes depending upon in which drive the media are put. If there is a drive name when storage site of a local information should be specified, there is the possibility that the desired file may not be at the specified site. The same applies to the case where connecting sequence of the driving units has changed and the drive may have different name.

In this respect, it is an object of the present invention to improve the following points in case information corresponding to the information specified by the user is read from a local storage medium:

the feature that the content of conversion information comprising the object to be converted (conversion object), conversion candidate and applicable condition can be arbitrarily determined in case the information specified by the user is re-read to the other information;

the feature that, when expressing the storage site of information of a portable storage medium, fixed expression having a drive name is not used at the time of installing;

the feature that the above conversion information can be added and/or updated later;

the feature that, in case there are a plurality of conversion candidates to a conversion object, an adequate candidate is selected; and the feature that two or more types of related information are also included in the conversion objects, and it is so designed that two or more types of related information can also be specified for the conversion candidate.

SUMMARY OF THE INVENTION

To solve the above problems, in the information providing system according to the present invention, conversion object address indicating storage status of an information which is to be a conversion object, a conversion candidate address indicating storage status of an information corresponding to said information, which is to be a conversion candidate, and a conversion information showing conversion relationship between said two addresses are obtained in advance and maintained by the user, and when the user requests that the information should be provided, it is converted from the requested information (conversion object) to the better information (conversion candidate) based on the conversion information in a system of the user, and the information is provided to the user.

Therefore, it is possible according to the present invention to eliminate trouble and complicated procedure on the server side in executing control when the information to match the environment of each user is provided because the conversion information is obtained in advance and maintained, and also to execute optimal conversion, i.e. to provide the optimal information suitable for environment of the user because conversion is carried out in the system on the user side.

A system according to claim 1 of the present invention at least comprises conversion information storage means for storing a conversion object address indicating storage status of a given information which is to be a conversion object, a conversion candidate address indicating storage status of an information corresponding to the above given information, which is to be a conversion candidate, and a conversion information indicating conversion relationship between the above two addresses, input means for accepting specifying of an arbitrary address or inputting of instruction, display/output means for displaying and/or outputting an arbitrary information, and control means for controlling said input means, said conversion information storage means and said display/output means, and, in case the conversion object address corresponding to the address specified by said input means is stored in said conversion information storage means, an entity of information indicated by the conversion candidate address corresponding to the conversion object address stored in said conversion information storage means is delivered to said display/output means at the instruction of said control means, whereby:

troublesome user control by the information server can be minimized because the conversion information is possessed by the user, and the user can obtain information, of which the user has not been aware, and further the corresponding relationship of the conversion information can be freely set because the relationship is entrusted to the provider.

A system according to claim 2 of the present invention at least comprises conversion information storage means for storing a conversion object script, which is a part or all of description of a given script, a conversion candidate script corresponding to said conversion object script, and a conversion information indicating conversion relationship between said two scripts, input means for accepting specifying of an arbitrary address or inputting of instruction, display/output means for displaying and/or outputting an arbitrary information, and control means for controlling said input means, said conversion information storage means and said display/output means, and, in case a part or all of description of the script indicated by the address specified by said input means is stored as a conversion object script in said conversion information storage means, the conversion object script stored in said conversion information storage means is converted to a conversion candidate script at the instruction of said control means and is turned to a script indicated by the address specified by said input means, and an entity of information indicated by the script obtained by said conversion is delivered to said display/output means; whereby:

by interpreting and reading again the script to another script, more detailed information can be provided to the user compared with the case where an entity of information is simply converted to another entity information.

A system according to claim 3 of the present invention has the same arrangement as the information providing system described in claim 1 or 2, wherein there is further provided communication means for transmitting and receiving information via a network, a conversion information is acquired using said communication means from an information server, which is present on the network and can provide information via said network at the instruction of the control means, and said conversion information is stored in the conversion information storage means, whereby:

by providing the conversion information via the network, it is possible to eliminate trouble and complicated procedure to distribute the conversion information summarized and controlled on the network to the users.

A system according to claim 4 of the present invention has the same arrangement as the information providing system described in claim 1 or 2, wherein said system comprises a storage medium where the conversion information is recorded, and there is further provided storage medium driving means for reading data from said storage medium or reading/writing the data, the conversion information is read using the storage medium driving means from said storage medium at the instruction of the control means, and said conversion information is stored in the conversion information storage means, whereby:

the conversion information is possessed by the storage medium, and even a user in a closed environment not connected to the network can obtain the conversion information.

A system according to claim 5 of the present invention has the same arrangement as the information providing system described in claim 4, wherein the storage medium is of portable type, whereby:

the conversion information is possessed by the portable storage medium, and the conversion information can be obtained from the portable storage medium, which can be conveniently carried.

A system according to claim 6 of the present invention has the same arrangement as the information providing system described in claim 5, wherein, in addition to the conversion information, at least a media-identifying information for uniquely determining type and content of the portable storage medium where said conversion information is recorded is recorded in said portable storage medium, and there is further provided media-identifying information storage means for storing the media-identifying information of said portable storage medium, and the media-identifying information of the portable storage medium set in the storage medium driving means is stored in said media-identifying information storage means at the instruction of the control means, whereby:

the media-identifying information is possessed by the portable storage medium where the conversion information is recorded, and by effectively utilizing it, it is possible to avoid duplication of registration processing such as re-registration of the conversion information, which has been registered already.

A system according to claim 7 of the present invention has the same arrangement as the information providing system described in claim 1 or 2, wherein the storage site of the conversion candidate indicated by the conversion candidate address of claim 1 or the storage site described in the conversion candidate script of claim 2 is expressed in such manner that it is possible to determine whether it is an information server on the network or a local storage medium, whereby:

in a system where the information providing system is not connected to the network, the information providing system is designed in such manner that it is possible to judge whether the conversion candidate of the obtained conversion information is remote or local, and if the conversion candidate is a remote information, it is possible to recognize in advance that the conversion candidate is ineffective and the ineffectiveness can be notified to the user by means such as message.

A system according to claim 8 of the present invention has the same arrangement as the information providing system described in claim 1, wherein a media-identifying information for uniquely determining type and content of the portable storage medium is at least recorded on said portable storage medium, there are further provided portable storage medium driving means for reading data from or for reading/writing the data from or to said portable storage medium, and media-identifying information storage means for storing the media-identifying information of said portable storage medium set on said portable storage medium driving means, and the storage site of the conversion candidate indicated by the conversion candidate address is expressed in such manner that it is possible to judge whether it possesses the media-identifying information stored in said media-identifying information storage means, whereby:

it is possible to judge whether the information expressed by the conversion candidate is effective to the user or not because it is possible to judge whether or not the conversion candidate of the conversion information obtained by the information providing system possesses the media-identifying information stored in the media-identifying information storage means.

A system according to claim 9 of the present invention has the same arrangement as the information providing system described in claim 2, wherein a media-identifying information for uniquely determining type and content of the portable storage medium is at least recorded in said portable storage medium, and there are further provided portable storage medium driving means for reading data from or for reading/writing the data from or to said portable storage medium and media-identifying information storage means for storing the media-identifying information of said portable storage medium set in said portable storage medium driving means, and the storage site described in the conversion candidate script has the media-identifying information stored in said media-identifying information storage means, whereby:

it is possible to judge whether the information indicated by the conversion candidate is effective to the user or not because it is possible to judge whether the conversion candidate of the conversion information obtained by the information providing system can possess the media-identifying information stored in the media-identifying information storage means or not.

A system according to claim 10 of the present invention has the same arrangement as the information providing system described in claim 6, wherein it is possible to judge as to from which portable storage medium the conversion information stored in the conversion information storage means has been obtained, whereby:

the conversion information can be put together in groups and controlled because it is possible to judge as to from which media-identifying information the portable storage medium has the conversion information has been obtained by the information providing system.

A system according to claim 11 of the present invention has the same arrangement as the information providing system described in claim 1, wherein, in case it is expressed that the storage site of the conversion candidate indicated by the conversion candidate address is the portable storage medium, a media-identifying information for uniquely determining type and content of the portable storage medium is at least recorded in said portable storage medium, there are further provided portable storage medium driving means for reading data from or for reading/writing data from or to said portable storage medium and media-identifying information storage means for storing media-identifying information of said portable storage medium set in said portable storage medium driving means, and said storage site is replaced by a type for uniquely specifying the driving site of said portable storage medium in the system, whereby:

the storage site of the conversion candidate is expressed in a type not including drive name in the system utilized by the user in the portable storage medium when it is distributed, while, by acquiring a drive name for uniquely identifying the storage site of the portable storage medium in the system, if the corresponding portable storage medium is not set in the drive, message is issued to call special attention so that it is set to the corresponding drive.

A system according to claim 12 of the present invention has the same arrangement as the information providing system described in claim 2, wherein, in case it is indicated that the storage site described in the conversion candidate script is a portable storage medium, a media-identifying information for uniquely determining type and content of the portable storage medium is at least recorded in said portable storage medium, there are further provided portable storage medium driving means for reading data from or for reading/writing data from or to said portable storage medium and media-identifying information storage means for storing media-identifying information of said portable storage medium set in said portable storage medium driving means, and said storage site is replaced by a type for uniquely specifying the driving site of said portable storage medium in the system, whereby:

the storage site of conversion candidate in the portable storage medium when it is distributed is expressed in the type not including the drive name in the system which user utilizes, by acquiring a driving name for uniquely specifying the storage site of the portable storage medium in the system, if the corresponding portable storage medium is not set in the drive, message is issued to call special attention so that it is set to the corresponding drive.

A system according to claim 13 of the present invention has the same arrangement as the information providing system described in claim 11 or 12, wherein there is further provided driving site storage means for storing the driving site of said storage medium driving means in relation to the media-identifying information of said portable storage medium, and the media-identifying information of the portable storage medium set in said storage medium driving means is replaced by said driving site, whereby:

by acquiring a drive name for uniquely specifying the storage site of the portable storage medium in the system and by storing the drive name, useless processing can be eliminated to judge where the portable storage medium indicated by the conversion candidate is present at each conversion.

A system according to claim 14 of the present invention has the same arrangement as the information providing system described in claim 1 or 2, wherein an updated information address for indicating storage status of the most up-to-date and/or additional information of the conversion information is at least recorded on the portable storage medium, there is further provided communication means for transmitting and receiving information via the network, the updated conversion information present on the network and in the information server capable to provide information via said network is acquired using said communication means based on the updated information address recorded on said portable storage medium, and the conversion information stored in said conversion information storage means is updated in accordance with said updated conversion information, whereby:

by recording the updated information address, indicating the storage site of conversion information for updating on the network, to the portable storage medium, the conversion information can be automatically updated by setting the portable storage medium on the drive.

A system according to claim 15 of the present invention has the same arrangement as the information providing system described in claim 14, wherein there is further provided updated information address storage means for storing updated information address, whereby:

by storing two or more updated information addresses in the updated address storage means, the conversion information can be updated by batch processing.

A system according to claim 16 of the present invention has the same arrangement as the information providing system described in claim 14, wherein the information server maintains updated version information relating to a version of said updated conversion information together with the updated conversion information, there is further provided version information storage means for storing version information, which is an information relating to the version of the conversion information stored in the conversion information storage means, the updated version information maintained by said information server is acquired using the communication means at the instruction of the control means, and said conversion information is updated by comparing said acquired updated version information with the version information of the conversion information stored in said version information storage means, whereby:

various types of settings can be performed by providing version information when the conversion information is updated.

A system according to claim 17 of the present invention has the same arrangement as the information providing system described in claim 6, wherein, from the updated information storage medium where at least the updated conversion information, i.e. the most up-to-date and/or additional information of the conversion information stored in the conversion information storage means and an application media-identifying information for uniquely determining type and content of the portable storage medium, from which said conversion information has been acquired, said application media-identifying information is read using the storage medium driving means at the instruction of the control means, and in case said application media-identifying information thus read is stored in the media-identifying information storage means as media-identifying information, among the conversion information stored in the conversion information storage means, the conversion information corresponding to said application media-identifying information is updated, whereby:

even in case it is wanted to update the conversion information in a system not connected with the network, by preparing at least the portable storage medium where the updated conversion information and the application media-identifying information are recorded, the conversion information matching the application media-identifying information can be updated, and because the portable storage medium where the updated conversion information is recorded does not specifically require the media-identifying information, this is also applicable to a conventional type portable storage medium having no media-identifying information.

A system according to claim 18 of the present invention has the same arrangement as the information providing system described in claim 17, wherein an updated version information, i.e. information relating to a version of said updated information conversion is further recorded on the updated information storage medium in addition to the updated information conversion and the application media-identifying information, there is further provided version information storage means for storing the information relating to a version of the conversion information stored in the conversion information storage means, and in case said application media-identifying information is stored in the media-identifying information storage means as media-identifying information, the updated version information recorded in said updated information recording medium is read using the storage medium driving means at the instruction of the control means, and said conversion information is updated by comparing said read updated version information with the version information of the conversion information stored in said version information storage means and corresponding to said application media-identifying information, whereby:

various types of settings can be performed by providing the version information when the conversion information is updated.

A system according to claim 19 of the present invention has the same arrangement as the information providing system described in claim 1 or 2, wherein, in case there are two or more conversion candidates to one conversion object, there is further provided candidate selecting means for selecting conversion candidate from said two or more conversion candidates, whereby:

in case there are two or more conversion candidates, candidate selecting means can select a candidate in accordance with a plurality of rules, and an adequate candidate can be selected and displayed according to the circumstances.

BRIEF DESCRIPTION OF THE DRAWINGS

These objects and features of the present invention will become more readily apparent from the following detailed description of the preferred embodiments taken in conjunction with the accompanying drawings in which:

FIG. 6 shows examples of screen when content of a script on the second line in Table 2 is displayed;

FIG. 7 shows examples of screen when content of a script in the third line in Table 3 is displayed;

FIG. 8 shows screen examples when content of a script on the fourth line in Table 2 is displayed;

DETAILED DESCRIPTION OF THE INVENTION

1st Embodiment

Figure 1:
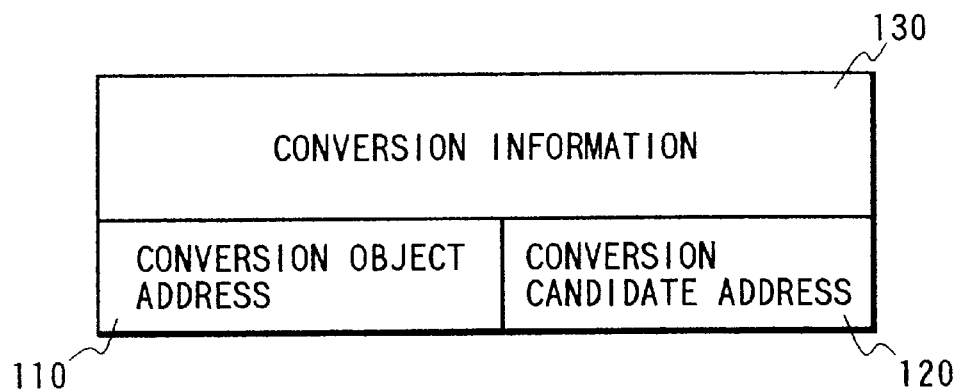
FIG. 1 is a conceptual view of a conversion information of a first embodiment of the present invention.

FIG. 1 is a conceptual view of a conversion information in a first embodiment of the present invention. In FIG. 1, reference numeral 110 represents a conversion object address, which indicates where and in what name the information of conversion source is stored in case there is another information to match an arbitrary information, i.e. it is possible to convert from an arbitrary information to another information, 120 represents conversion candidate address to indicate storage status of an information corresponding to the original information indicated by the conversion object address 110, and 130 represents conversion information, which comprises a conversion address 110 and the conversion candidate address 120, indicating corresponding relationship of the conversion object address 110 to the conversion candidate address 120.

Figure 2:
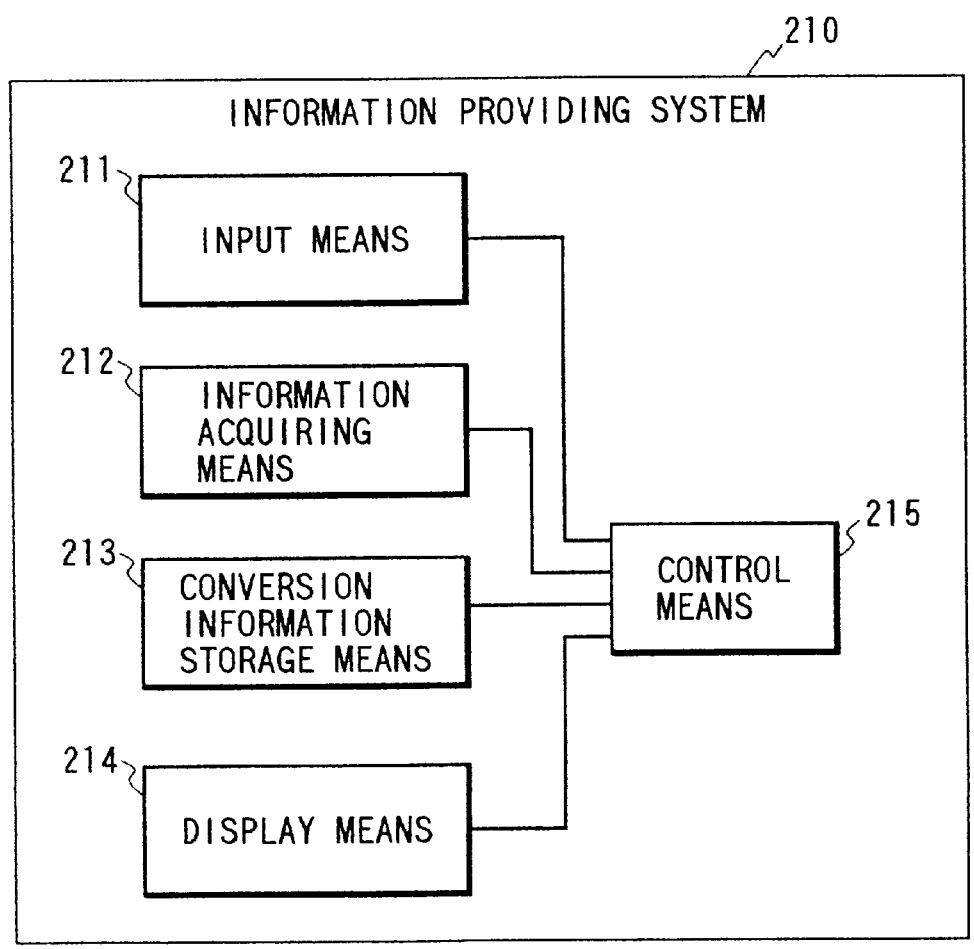
FIG. 2 is a schematical block diagram of an information providing system in the first and the second embodiments of the present invention.

FIG. 2 shows an arrangement of an information providing system of the first embodiment of the invention.

In FIG. 2, reference numeral 210 represents an information providing system for providing information to users, 211 is input means such as keyboard, mouse, voice recognizer, tablet, pen, etc., by which the user of the information providing system 210 inputs data, 212 is information acquiring means, by which the information providing system 210 acquires conversion information from outside or other necessary information, 213 is conversion information storage means for storing the conversion information 130 acquired by the information acquiring means 212, 214 is display means such as display unit, by which the information providing system 210 displays the information to users, 215 is control means for controlling the input means 211, the information acquiring means 212, the conversion information storage means 213 and the display means 114.

Figure 3:
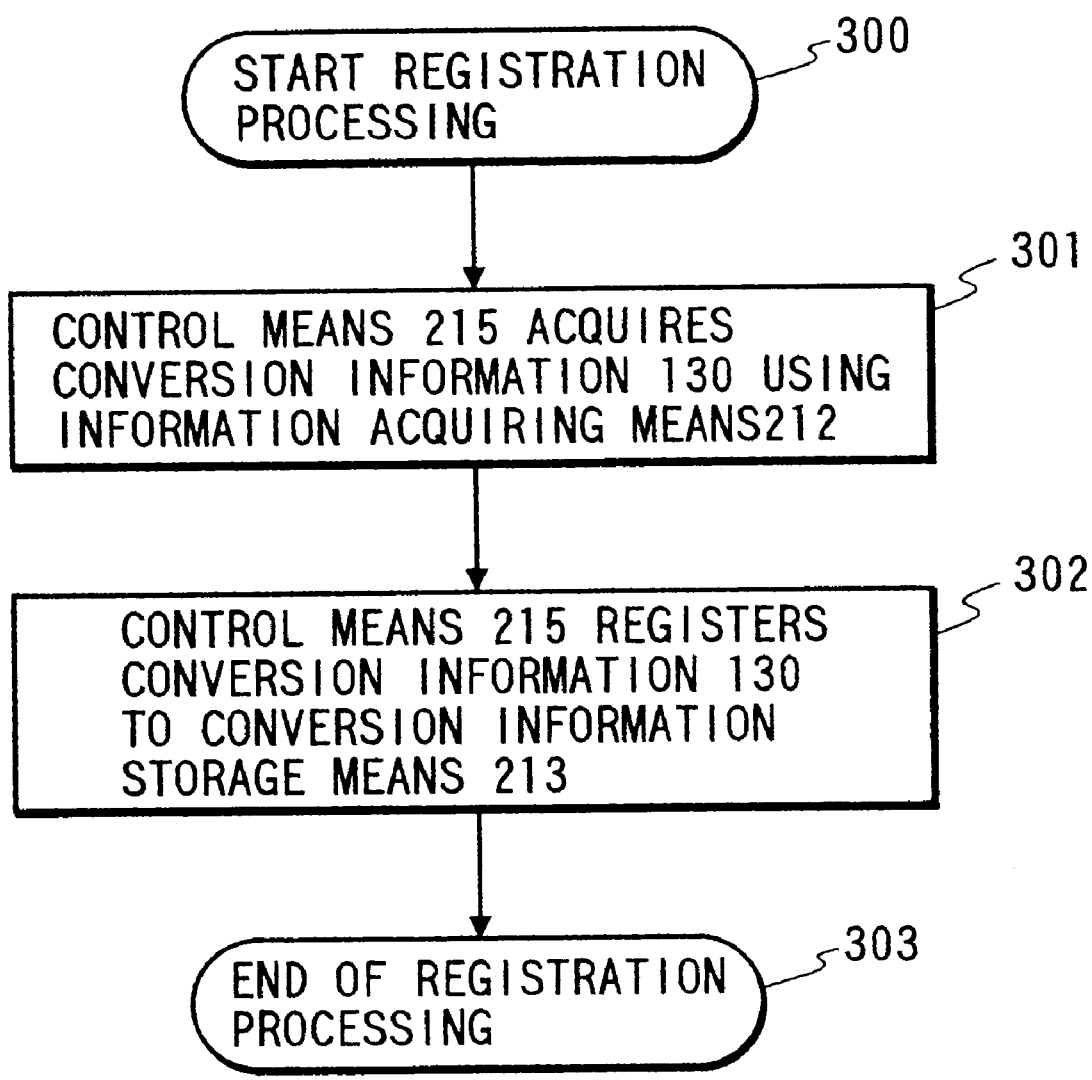
FIG. 3 is a flow chart showing flow of processing to register a conversion information in the first embodiment of the present invention.

FIG. 3 is a flow chart showing flow of processing to register conversion information in a first embodiment of the present invention.

Figure 4:
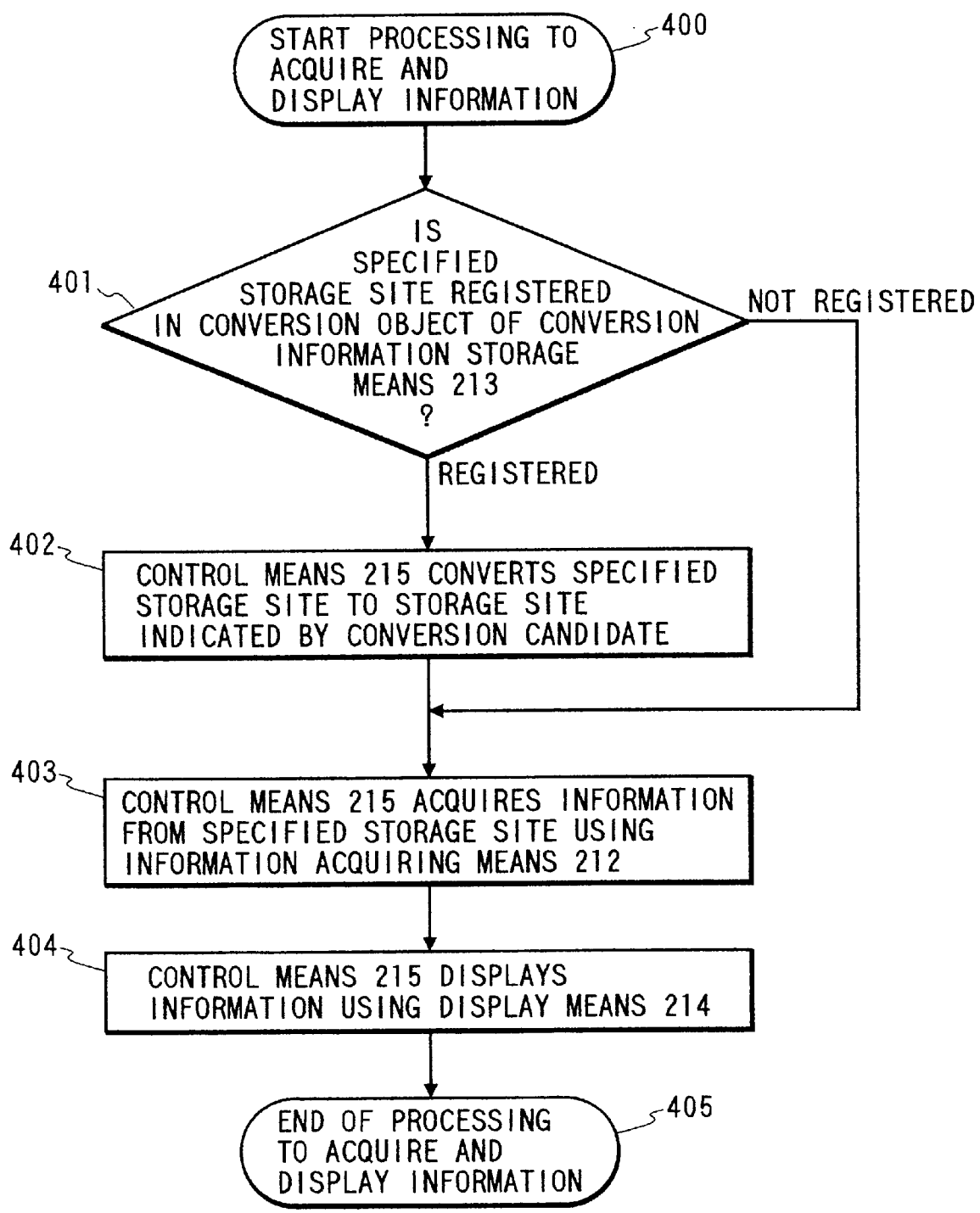
FIG. 4 is a flow chart showing flow of processing to acquire and display information in the first embodiment of the present invention.

FIG. 4 is a flow showing flow of processing to acquire and display the information in a first embodiment of the present invention.

Table 1 is a concrete example using "uniform resource locators" (hereinafter referred as "URL") in the conceptual view of the conversion information explained in FIG. 1.

TABLE 1

Conversion information

| Conversion object address | Conversion candidate address | Applicable conditions |
|---|---|---|
| http://farhostA/aaa.gif | http://nearhostX/aaa.gif | http://somehost/textA.htm Only when referring to ... |
| http://farhostA/bbb.gif | http://nearhostY/ccc.jpg | (None) |
| http://farhostB/ddd.gif | http://nearhostX/eee.jpg | Only when referring to http://somehost/textB.htm |
| http://farhostC/fff.jpg | http://nearhostZ/ggg.mpg | Only when referring to http://somehost/textC.htm or http://somehost/textD.htm |

In Table 1, the applicable condition means the description item, which gives conditions necessary for conversion when conversion is performed from conversion object to conversion candidate. For example, the first line in the above table means that, only when referring to a file of "textA.htm" of an arbitrary host using protocol "http", to the designation of the user to acquire the file of "aaa.gif" in the server "farhostA" using the protocol "http", conversion is performed to acquire the file "aaa.gif" at the server "nearhostX".

In the following, description will be given on the flow of processing in the present embodiment using FIG. 2 to FIG. 4.

First, in case conversion information is registered, the information providing system 210 starts registration of the conversion information by the designation of the user or by setting to execute batch processing in a given time zone (300).

The control means 215 acquires the conversion information 130 using the information acquiring means 212 (301), stores the conversion information 130 in the conversion information storage means 213 (302), and completes the registration of conversion information to the information providing system 210 (303).

Next, in case information is to be acquired and displayed using the conversion information, the information providing system 210 starts to acquire and display the information by the designation of the user (400).

The control means 215 checks whether the information stored at the storage site specified by the input means 211 is registered as the conversion object in the conversion information storage means 213 (401).

If it is registered, the control means 215 converts it to conversion candidate (402). In this case, if there is the applicable condition as given in Table 1, conversion is executed if the applicable condition is satisfied. Conversion is not executed if not satisfied.

On the other hand, if it is not registered, it is advanced to the next step without executing conversion.

The control means 215 acquires the entity of the information using the information acquiring means from the storage site indicated by the conversion candidate (403), displays the acquired entity of information using the display means 214 (404) and terminates the processing to acquire and display the information (405).

In the present embodiment, it is supposed that the information providing system 210 acquires necessary information such as conversion information from outside by the information acquiring means 212 as shown in FIG. 2 to facilitate explanation, while, if the information is acquired from the network, for example, various means may be used as the means having communication function, i.e. the means having function to read the information from the storage medium in case it is storage medium, or the means having both functions may be used.

The corresponding relation of the conversion object with the conversion candidate is based on the intention of the provider which provides the conversion information, and it is needless to say that it is not limited to those given in Table 1. For example, in case conversion candidates "Y, Z" correspond to the conversion object "X", Y is first displayed, and as soon as Z is acquired, Z is displayed instead of Y, or Z may be displayed by overlapping it on Y, and there are infinite number of conversion methods for the corresponding relation of the conversion object to the conversion candidate.

The judgment as to whether the information specified by the user is registered in the conversion information storage means as the conversion object or not depends upon the setting on the provider of the conversion information or the setting such as judgment processing on the information providing system. Conversion may be executed only in case the expression specified by the user perfectly agrees with the descriptive expression of the conversion information or conversion may be performed in case some similarity is found.

Also, as shown in Table 1, URL is used to express the storage site of conversion object and conversion candidate, while it is not limited to this, and other expression may be used such as URN (uniform resource names).

As described above, it is possible according to the present embodiment to minimize troublesome user control of the information server because the conversion information provided is possessed by the user. Also, in case an information which the user does not aware of, e.g. in case an information equivalent to the one specified by the user is present near the user, the information may be acquired from the place nearby instead of acquiring data of large amount of information via fine circuit line. Also, the corresponding relation of the conversion information is entrusted to the provider, and this can be set freely, and it has practically enormous effect.

2nd Embodiment

Next, detailed description will be given on conversion of script as the information to be converted, and on display of the content to be converted.

FIG. 2 shows an arrangement of an information providing system of a second embodiment of the invention. Regarding FIG. 2, description is the same as in the first embodiment, and detailed description is not given here.

Figure 5:
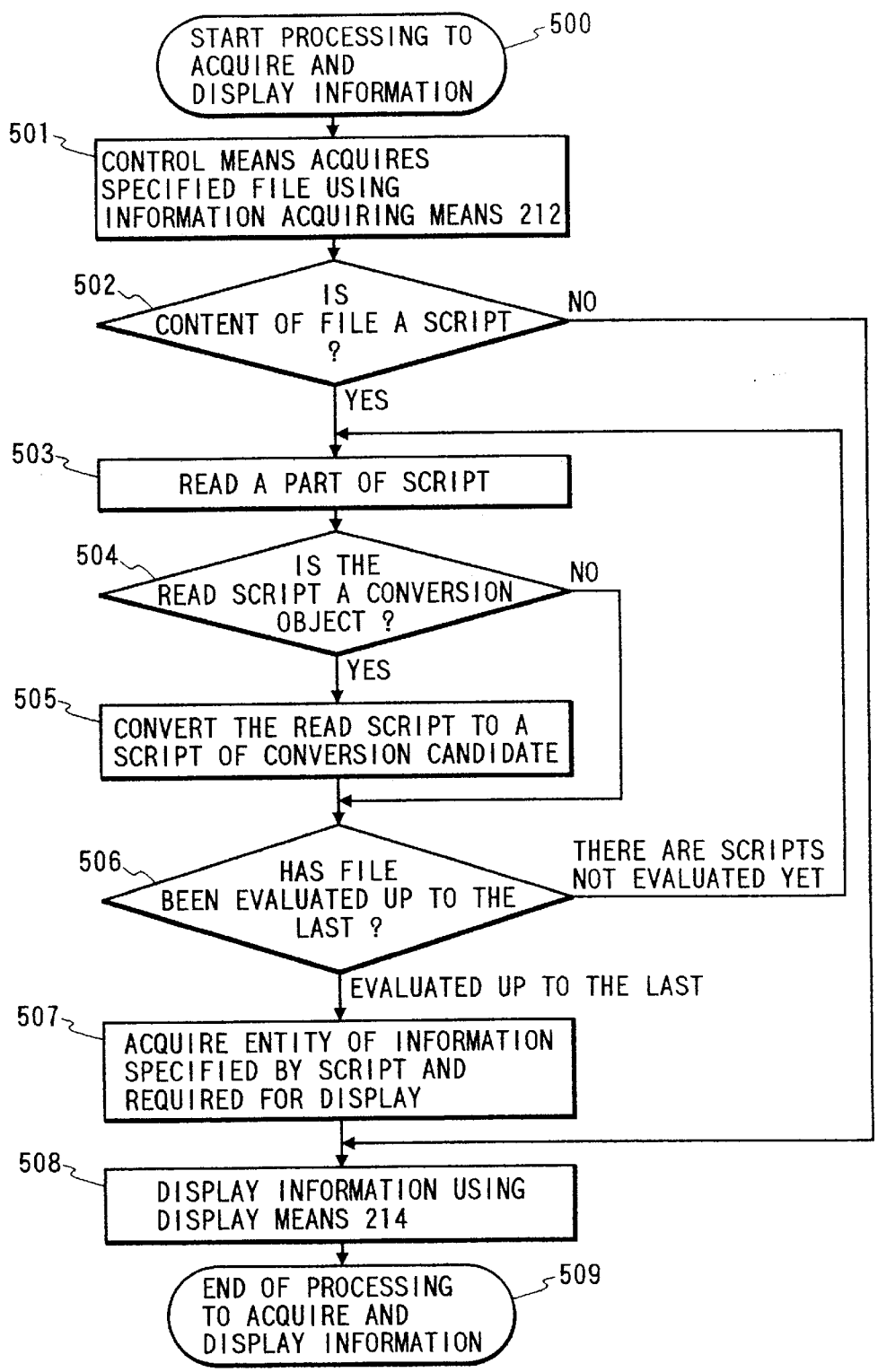
FIG. 5 is a flow chart showing flow of processing of a conversion information in a second embodiment of the present invention.

FIG. 5 is a flow chart showing flow of processing in the second embodiment of the present invention.

Table 2 shows a concrete example of conversion information in the present embodiment.

TABLE 2

Conversion information

| Conversion object script | Conversion candidate script |
| --- | --- |
| <img src=http://farhostA/aaa.gif> | <img src=http://nearhostX/aaa.gif> |
| <img src=http://farhostB/bbb.gif> | <img src=http://nearhostX/ccc.jpg> |
| <img src=http://farhostC/ddd.gif> | <video src=http://nearhostY/eee.mpg> txt=http://nearhostZ/fff.txt> |
| <img src=http://farhostC/ggg.gif> <a href=http://farhostC/hhh.jpg> Detailed image </a> | <img src=http://nearhostZ/iii.jpg) |
| <img src=http://farhostC/jjj.gif> <a href=http://farhostC/kkk.jpg> Detailed image </a> | <img src=http://nearhostZ/lll.mpg> |
| Kurage (jellyfish) | <a href=http://nearhostZ/kurage.html> Kurage (jellyfish) </a> |
| Large dogs | Large dogs (Saint Bernard, golden retriever, etc.) |

In Table 2, the script is of the type similar to "hyper text markup language" (hereinafter referred as "HTML"). For example, the second line in the above table means that, instead of displaying an image file of "bbb.gif" of "farhostB", which is present at a position remote from the information providing system 210, an image file "ccc.jpg" or "nearhostX" at relatively closer position is displayed, and a screen example is given in FIG. 6. In FIG. 6, "A" shows a screen where conversion is not performed, and "B" represents a screen where conversion is performed.

The third line in the table means that, instead of displaying an image file of "ddd.gif" of "farhostC" at a position remote in the network from the information providing system 310, a text file of "fff.txt" of "nearhostZ" is synthesized as a subtitle on a moving picture file of "eee.mpg" of "nearhostY" at a position relatively closer on the network and is displayed. A screen example is given in FIG. 7.

The fourth line in the above table displays an information of "ggg.gif" of "farhostC" at a position in the network far from the information providing system 210. If there is a request from the user to click an anchor displayed by character string of "detailed image", it means that a file "hhh.jpg" having large capacity should be sent. In the conversion candidate, this means that an image file of "iii.jpg" of "nearhostZ" at a position relatively closer on the network to the information providing system 210 should be displayed. A screen example is given in FIG. 8. In FIG. 8, "A" shows a screen example in case it is instructed that a file of "hhh.jpg" having larger capacity should be sent.

The fifth line in the above table means that, instead of displaying character string of "jellyfish" (kurage) present in description of an arbitrary script file on the screen, an anchor of character string display of "jellyfish" is displayed on the screen, and in case the anchor is specified, relevant document of "kurage.html" of "nearhostZ" at a relatively closer position is displayed.

The sixth line means that, instead of displaying character string of "large dogs" present in description of an arbitrary script file on the screen, a character string of "large dogs (Saint Bernard, golden retriever, etc.)" is displayed.

In the following, description will be given on the flow of processing in the present embodiment referring to FIG. 2 and FIG. 5.

First, the user specifies the file of the entity of the information to be displayed using the input means 211, and the information providing system 210 starts the processing to acquire and display the information (500).

The control means 215 acquires the file specified by the user using the information acquiring means 212 (501) and checks whether the content of the acquired file is a script or not (502).

In the content of the file is a script, the control means 215 reads a part of the script (503) and checks whether the read script is registered as a conversion object to the conversion information storage means 213 or not (504).

If it is registered as the conversion object, the control means 215 converts the script of this portion to a conversion candidate based on the conversion information stored in the conversion information storage means 213 (505), and it is advanced to Step 506. On the other hand, if it is not registered as the conversion object, no conversion to the conversion candidate is executed naturally, and it is advanced to Step 506.

In Step 506, on each of the scripts acquired by the information acquiring means 212, evaluation is made as to whether it is a script to be converted in the description or not, and whether conversion has been carried out or not if it is a script to be converted (506). If not carried out yet for all, it should go back to Step 503, and processing from Step 503 to Step 505 should be repeated. If this is completed, it is advanced to Step 507.

In Step 507, the control means 215 acquires the entity of information necessary for display from the specified storage site based on the content of the converted script (507). In this case, there may be information, which is indicated by two or more storage sites in one conversion candidate. In case it is necessary to have two or more information in advance i.e. in case it is necessary to accumulate the read data in order that subtitle information is acquired from remote position and this is combined with a motion picture, which is an entity of information read from a local position, it is needless to say that means to accumulate data may be provided.

When the information necessary for display is at hand, the control means 215 displays the acquired information using the display means 214 (508), and the processing to acquire and display the information is completed (509).

In Step 502, if the information acquired by the information acquiring means 212 is not a script, the information is displayed using the display means 214 (508), and the processing to acquire and display the information is completed (509).

To facilitate explanation, it is supposed in the present embodiment that the information providing system 210 acquires necessary information such as conversion information from outside by the information acquiring means 212 as shown in FIG. 2, while, various means may be used such as the means having communication function if the information is acquired from the network, and the means having the function to read information from storage medium if it is acquired from a storage medium, or the means having both functions.

It is needless to say that the corresponding relation of the conversion object to the conversion candidate is up to the intention of the provider of the conversion information, and it is not limited to the one given in Table 2.

The judgment as to whether the information specified by the user is registered as conversion object in the conversion information storage means or not depends upon the arbitrary setting of the provider of the conversion information or on the setting such as judgment on the information providing system. Conversion may be performed only in case the expression specified by the user perfectly agrees with the descriptive expression of the conversion information or in case some similiarity is found.

No concrete description has been given on the script acquired by the information acquiring means 212. As it is evident when imagining the preparation of a home page in Internet, the description of the script is considerably long. Conversion of script as mentioned in the present embodiment means conversion of all or a part of the scripts acquired by the information acquiring means 212. The conversion object script may be a character string from tag to tag as shown in Table 2 or may be a simple character string including no tag. Specifically, the conversion object script mentioned in the present embodiment is not limited to the character string from tag to tag as commonly recognized, but it means all or a part of script file character string, which would be described as the scripts acquired by the information acquiring means 212.

As described above, it is possible according to the present embodiment to provide more detailed information to the users and higher practical effect can be obtained compared with simple conversion from the entity of one information to entity of another information by interpreting the script and by re-reading it to another script.

3rd Embodiment

Next, detailed description will be given on the case where conversion information is acquired on the network.

Figure 9:
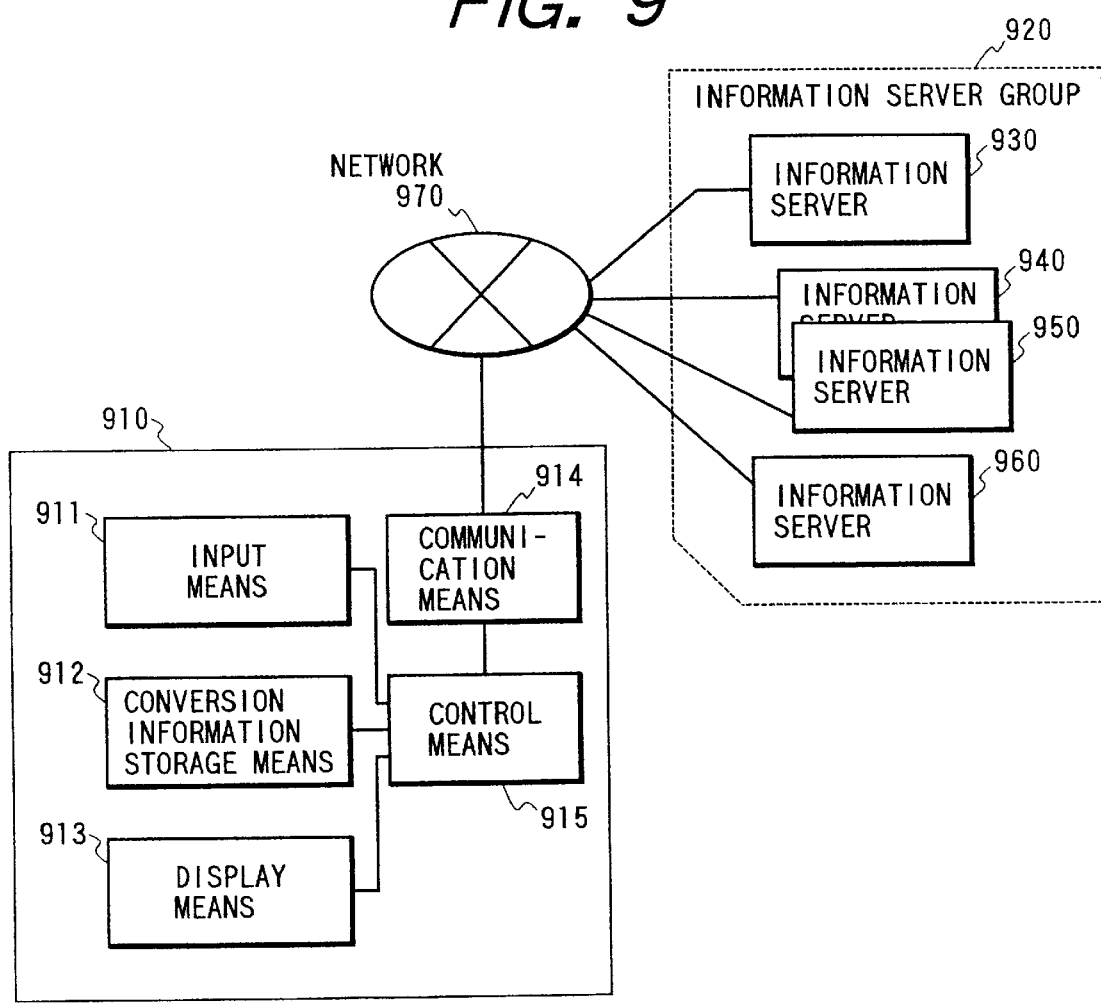
FIG. 9 is a schematical block diagram of an information providing system in a third embodiment of the present invention.

FIG. 9 shows an arrangement of an information providing system of a third embodiment of the present invention.

In FIG. 9, reference numeral 910 represents an information providing system for providing information to users, 911 is input means such as keyboard, mouse, voice recognizer, tablet, pen, etc., by which the user of the information providing system 910 inputs data, 912 is conversion information storage means for storing conversion information, 913 is display means such as display unit, by which the information providing system 910 displays information to the user, 914 is communication means, by which the information providing system 910 transmits and receives information via a network, 915 is control means for controlling the input means 911, the conversion information storage means 912, the display means 913 and the communication means 914, 920 represents information server group representing a group of information servers capable to provide any specified information, reference numerals 930, 940, 950 and 960 each represents an information server included in the information server group 920, and 970 represents a network connected with the information providing system 910 with the information server group 920.

To facilitate explanation, it is supposed in the present embodiment that the information server 930 possesses the conversion information 130.

Figure 10:
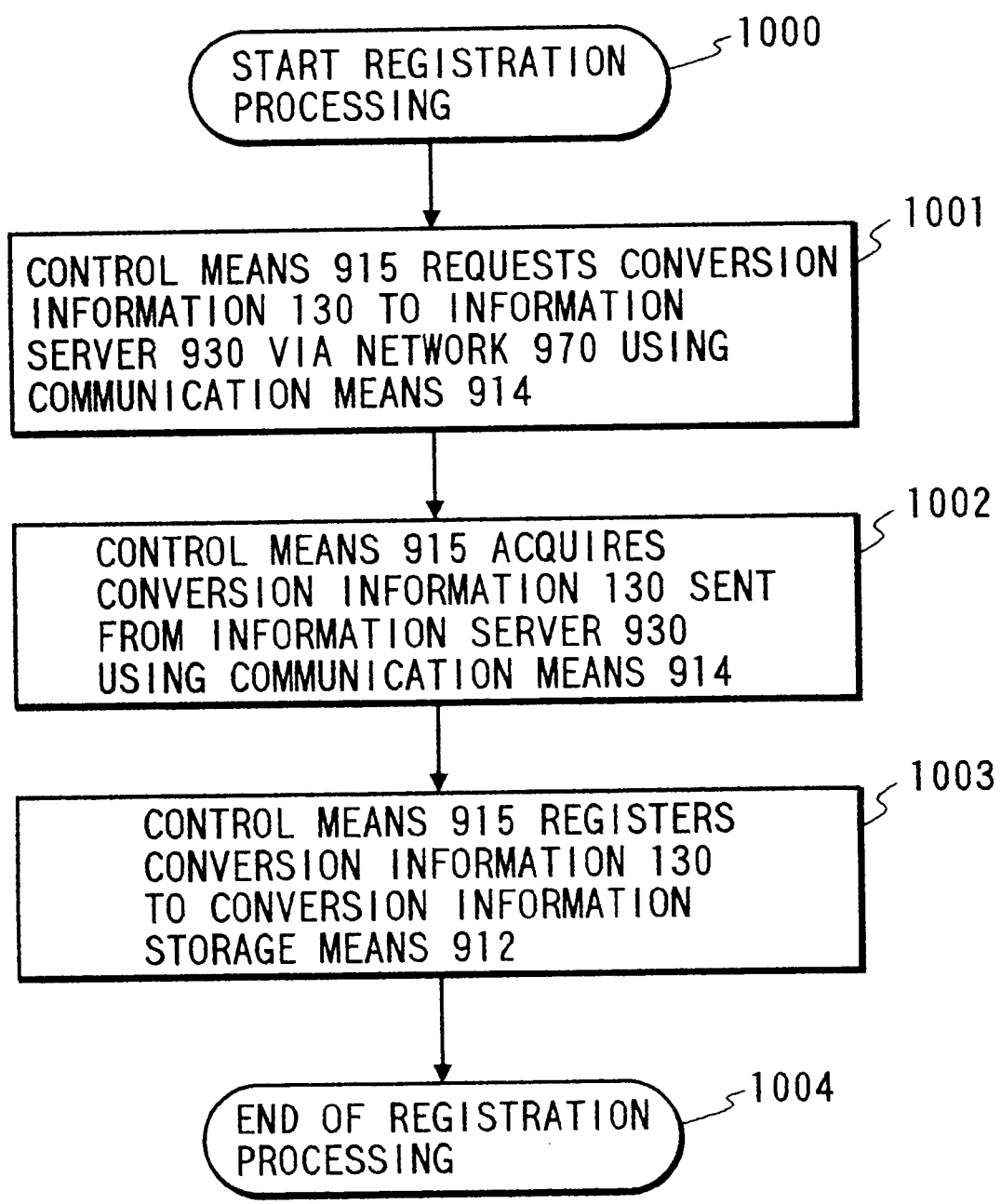
FIG. 10 is a flow chart showing flow of processing of an information providing system in the third embodiment of the present invention.

FIG. 10 is a flow chart showing flow of processing of an information providing system of a third embodiment of the present invention.

In the following, description will be given on the flow of processing of the present embodiment referring to FIG. 9 and FIG. 10. By designation of the user or by setting such as execution of batch processing in a given time zone, the information providing system 910 starts processing to register the conversion information (1000).

The control means 915 acquires the conversion information 130 transmitted from the information server 930 using the communication means 914 (1002).

The control means 915 stores the acquired conversion information 130 in the conversion information storage means 912 (1003) and terminates the processing to register the conversion information 130 from the information server 930 to the information providing system 910 (1004).

It is needless to say that the same effect can be obtained in a system as explained in the second embodiment, i.e. a system where "conversion is not performed immediately after the information is specified from the user, and the information as specified is acquired first, and in case the information is a script, conversion is performed".

To facilitate explanation, it is supposed in the present embodiment that the information server group 920 is a group of four information servers as shown in FIG. 9, while the number of the information servers may be one or any number other than four. That is, the information providing system 910 is connected to one or more information servers via the network.

As described above, it is possible according to the present embodiment to obtain the same effect as in the first or the second embodiments by providing conversion information via the network, and it is also possible to eliminate troublesome procedure to distribute conversion information controlled on the network to the users, and the effects in practical application are enormous.

4th Embodiment

Next, detailed description will be given on the case where conversion information is acquired from a portable storage medium.

Figure 11:
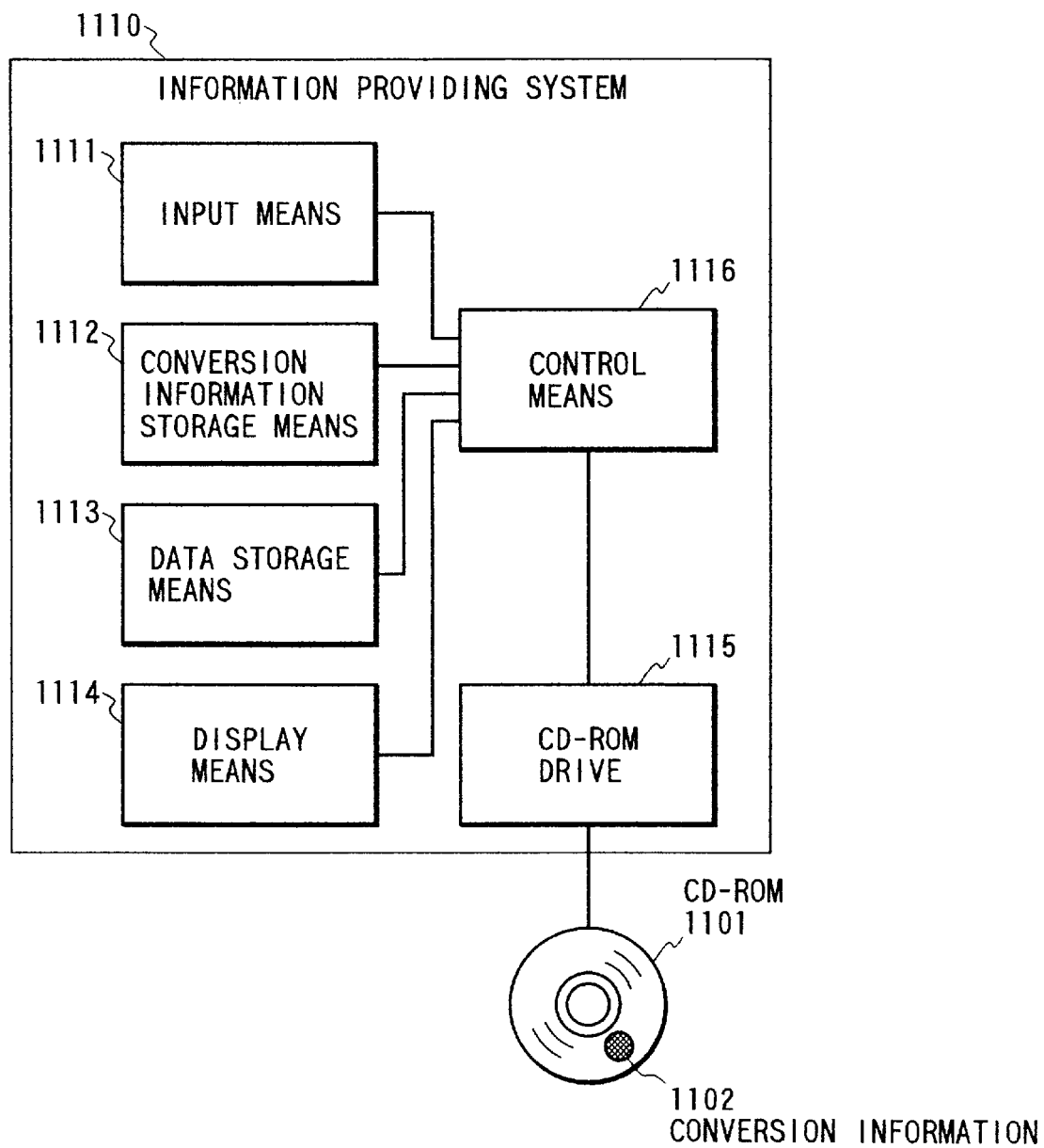
FIG. 11 is a schematical block diagram of an information providing system in a fourth embodiment of the present invention.

FIG. 11 shows an arrangement of an information providing system in a fourth embodiment of the present invention.

In FIG. 11, reference numeral 1101 represents a CD-ROM, 1102 is a conversion information recorded on the CD-ROM 1101, 1110 is an information providing system for providing information to users, 1111 is input means such as keyboard, mouse, voice recognizer, tablet, pen, etc., by which the user of the information providing system 1110 inputs data, 1112 is conversion information storage means for storing conversion information, 1113 is data storage means, by which the information providing system 1110 stores necessary information, 1114 is display means such as display unit, by which the information providing system 1110 displays information to the users, 1115 is a CD-ROM drive for driving the CD-ROM 1101, and 1116 is control means for controlling the input means 1111, the conversion information storage means 1112, the data storage means 1113, the display means 1114 and the CD-ROM drive 1115.

Figure 12:
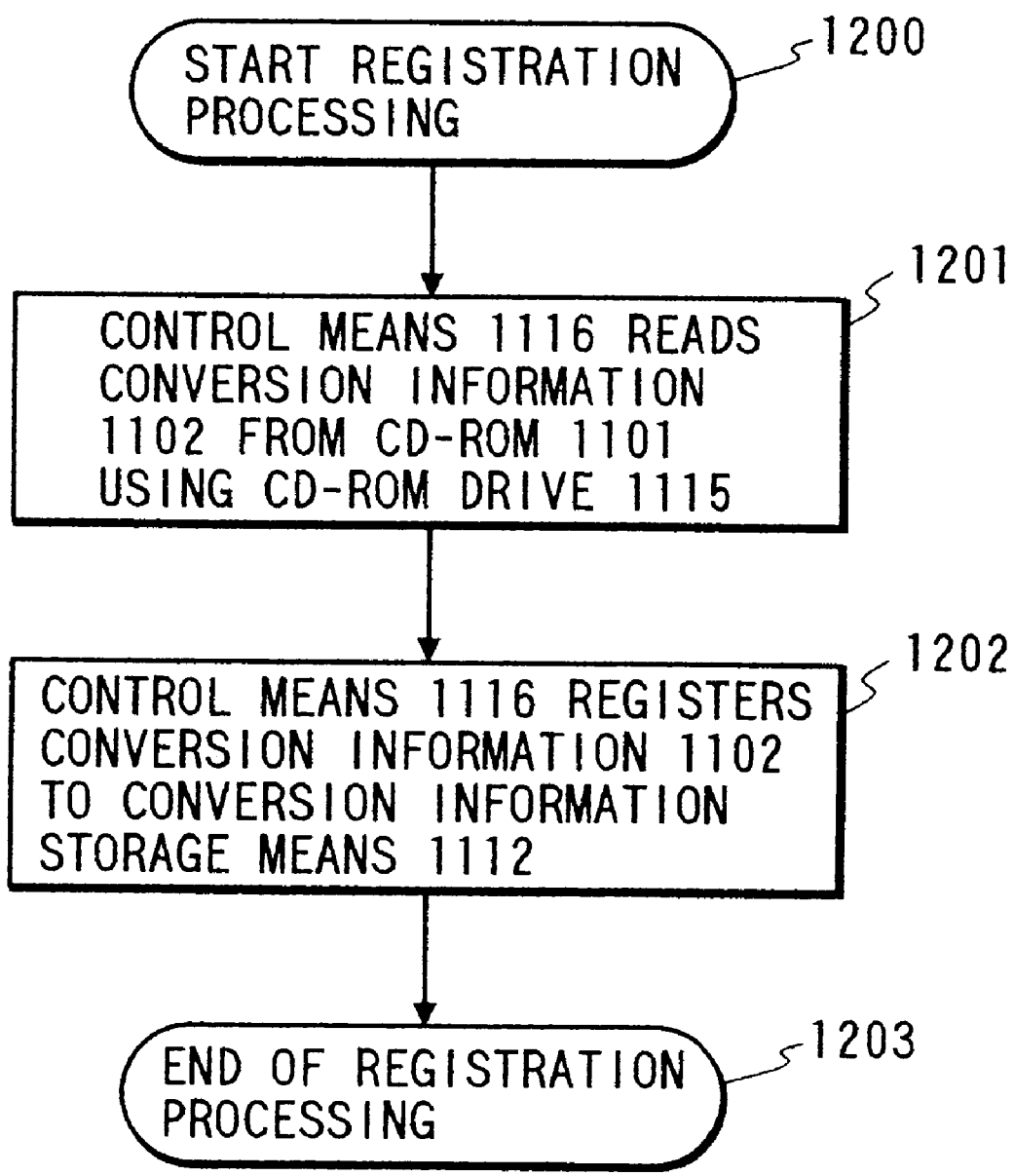
FIG. 12 is a flow chart showing flow of processing in an information providing system of the fourth embodiment of the present invention.

FIG. 12 is a flow chart showing flow of processing of an information providing system in a fourth embodiment of the present invention.

In the following, description will be given on the flow of processing in the present embodiment referring to FIG. 11 and FIG. 12. When specified by the user or by the setting such as execution of batch processing in a given period of time, the information providing system 1110 starts processing to register the conversion information (1200).

The control means 1116 reads the conversion information 1102 from the CD-ROM 1101 using the CD-ROM drive 1115 (1201).

The control means 1116 stores the read conversion information 1102 in the conversion information storage means 1112 (1202), and the processing to register the conversion information 1102 from the CD-ROM 1101 to the information providing system 1110 is terminated (1203).

It is needless to say that the same effect can be obtained in a system as explained in the second embodiment, i.e. in a system where "conversion is not carried out immediately when specified by the user, and the information as specified is acquired first, and in case the information is a script, conversion is performed".

To facilitate explanation, it is supposed in the present embodiment that the conversion information is acquired from the CD-ROM 1101 as shown in FIG. 11, while it may be acquired from floppy disk ("FD"), MO, DVD-ROM, etc. or may be of read-only type or rewritable type. Any type of CD-ROM drive 1115 may be used such as FD drive or DVD-ROM drive so far as it can normally drive the CD-ROM 1101.

It is described that conversion information is acquired from the CD-ROM 1101, while it is not limited to a portable storage medium such as CD-ROM, and it may be a hard disk or merely a storage medium such as a removable hard disk. In this case, any means may be used so far as the system is provided with the function of the CD-ROM drive 1115, and such function may be performed by the control means.

As described above, it is possible according to the present embodiment to obtain the same effects as in the first or the second embodiments because the conversion information is provided in the portable storage medium, and even a user in closed environment not connected with the network can acquire conversion information. Thus, the effects in practical application are enormous.

5th Embodiment

Next, description will be given on an example of conversion information stored in the conversion information storage means in the information providing system according to the first to the fourth embodiments.

Table 3 shows content of the conversion information stored by the conversion information storage means in the information providing system as explained in the first to the fourth embodiments.

TABLE 3

| Local/Remote | Conversion candidate address Storage site |
|---|---|
| Local | file:///data/image/A |
| Local | file:///data/image/B |
| Remote | http://remotehost/C |
| Remote | http://remotehost/D |
| Local | file:///data/video/E |
| Local | file:///data/audio/F |
| ... | |

In Table 3, the first line indicates a file called A having storage site of the conversion candidate in a directory of "/data/image" of a local storage medium. The second, the fifth and the sixth lines represent a file called B in a directory of "/data/image" in a local storage medium, a file E in a directory of "/data/video", and a file called F in a directory of "/data/audio" respectively.

The third line and the fourth line indicate a file C and a file D obtained using a protocol "http" from a remote place represented by "remotehost".

In Table 3, in case the storage site is remote, accessible information server is stored in advance on the information providing system side. This can be applied in the case as follows: If a conversion candidate is present on the accessible information server, the conversion candidate is an effective information, and if it is present on an inaccessible server, the conversion candidate is an ineffective information.

As described above, in the present embodiment, it is possible to judge whether conversion candidate of the conversion information acquired by the information providing system is remote or local. Accordingly, in a system where the information providing system is not connected with the network, it is possible to recognize in advance that, in case the conversion candidate is a remote information, the conversion candidate is ineffective or to notify the user that it is ineffective using a message, and its effects in practical application are enormous.

6th Embodiment

Next, detailed description will be given on a case where conversion information is acquired from a portable storage medium having media-identifying information.

Figure 13:
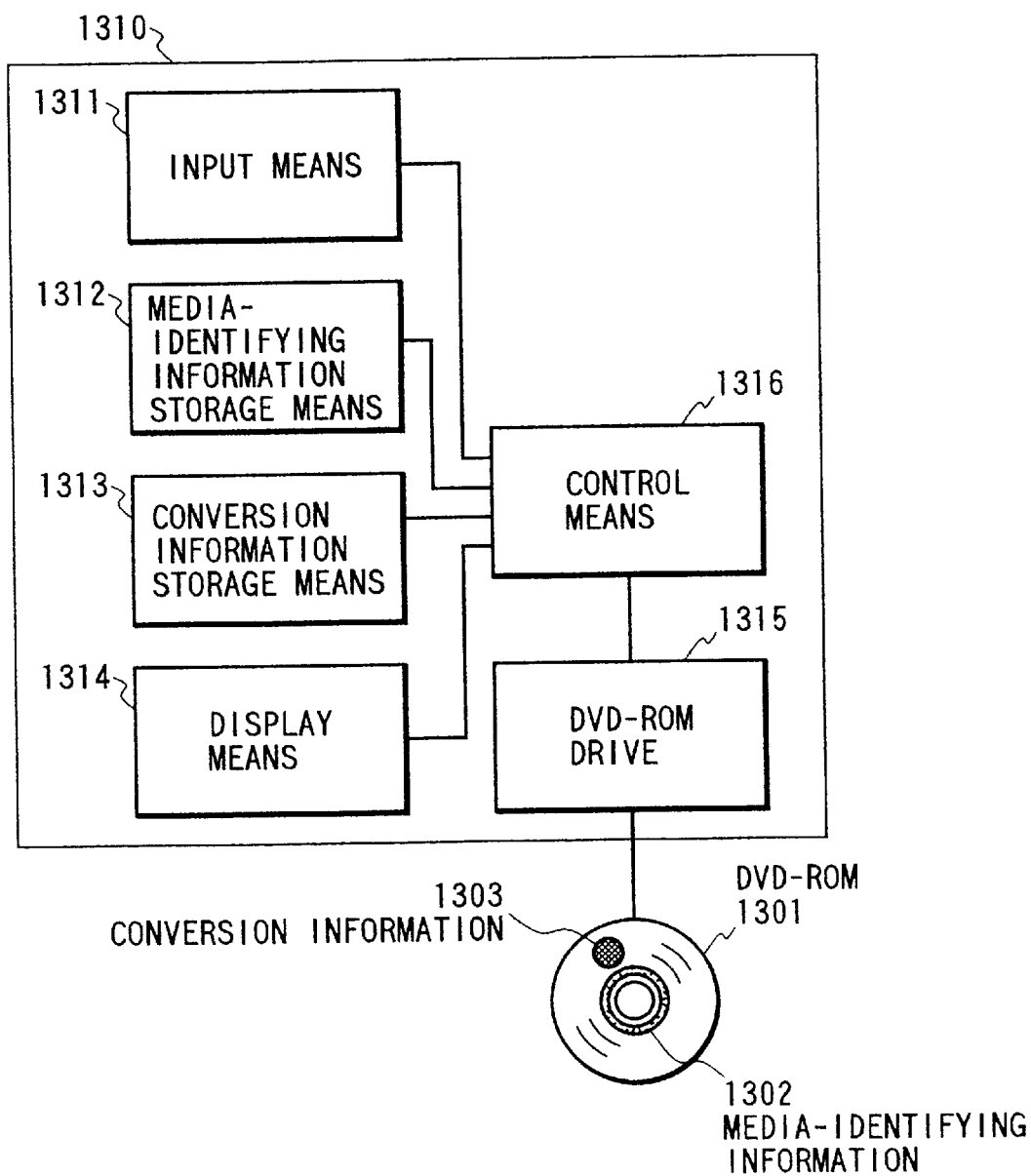
FIG. 13 is a schematical block diagram of an information providing system in a sixth embodiment of the present invention.

FIG. 13 shows an arrangement of an information providing system in a sixth embodiment of the present invention.

In FIG. 13, reference numeral 1301 represents a DVD-ROM where various types of information are recorded, 1302 is a media-identifying information, which can uniquely specify type and content of the DVD-ROM 1301, 1303 is a conversion information, 1310 is an information providing system for providing information to users, 1311 is input means such as keyboard, mouse, voice recognizer, tablet, pen, etc., by which the user inputs data, 1312 is media-identifying information storage means for storing previous media-identifying information or a new media-identifying information, e.g. media-identifying information 1302 of the DVD-ROM 1300, 1313 is conversion information storage means for storing previous conversion information or a new conversion information, e.g. conversion information 1303 of the DVD-ROM 1301, 1314 is display means such as display unit, by which the information providing system 1310 displays information to users, 1315 is a DVD-ROM drive for driving the DVD-ROM 1301, and 1316 is control means for controlling the input means 1311, the media-identifying information storage means 1312, the conversion information storage means 1313, the display means 1314, and the DVD-ROM drive 1315.

Figure 14:
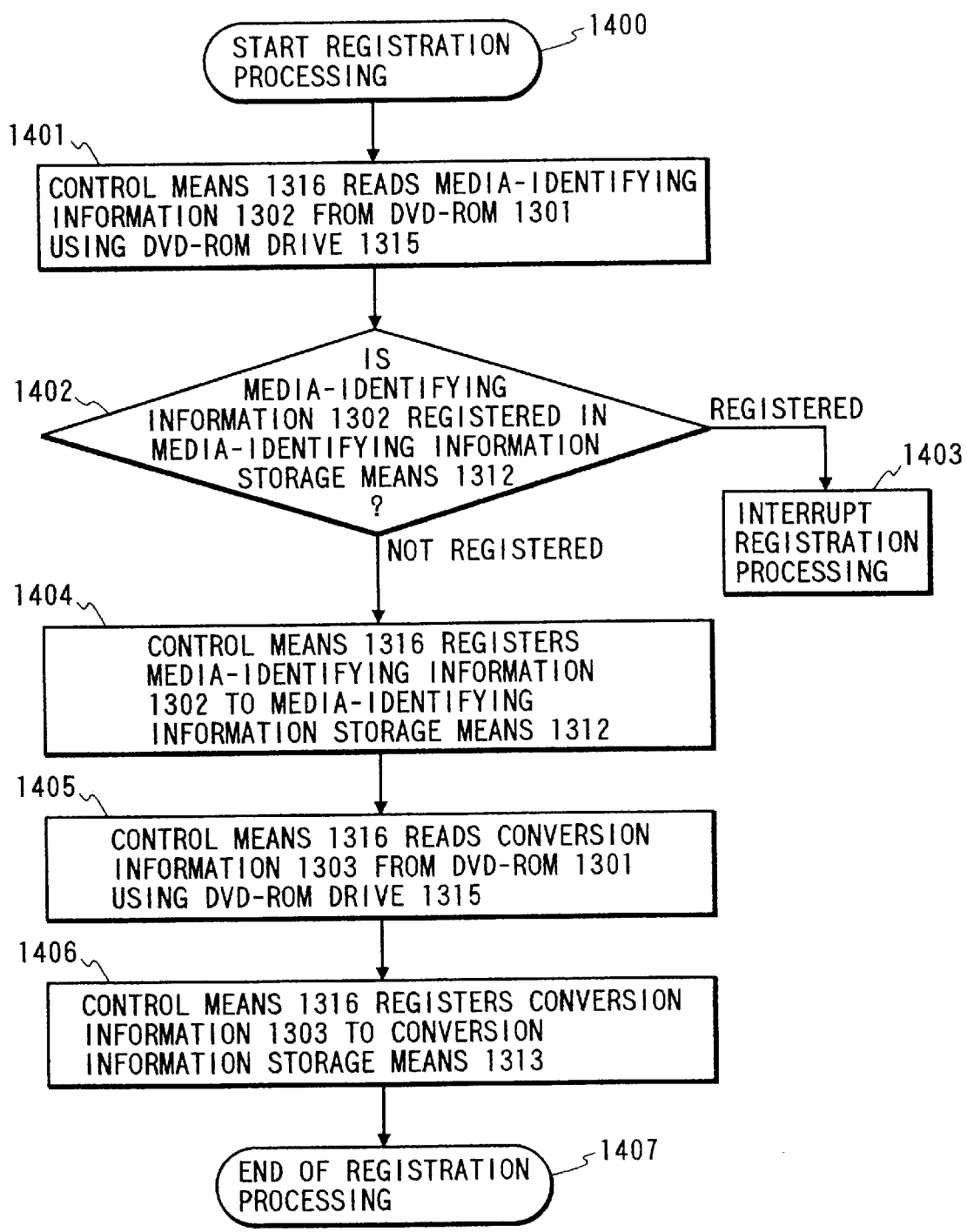
FIG. 14 is a flow chart showing flow of processing of an information providing system in the sixth embodiment of the present invention.

FIG. 14 is a flow chart showing flow of processing of an information providing system of a sixth embodiment of the present invention.

In the following, description will be given on the flow of processing in the present embodiment referring to FIG. 13 and FIG. 14.

When it is detected that the DVD-ROM 1301 has been set to the DVD-ROM drive 1315, the control means 1316 starts the processing to register the conversion information (1400).

The control means 1316 reads the media-identifying information 1302 in the DVD-ROM 1301 using the DVD-ROM drive 1315 (1401) and checks whether the read media-identifying information 1302 is already registered in the media-identifying information storage means 1312 or not (1402).

If the media-identifying information 1302 is already registered, it is judged that the conversion information 1303 of the DVD-ROM 1301 is already registered in the conversion information storage means 131, and the processing to register is stopped (1403).

On the other hand, if the media-identifying information 1302 is not registered, the control means 1316 registers the media-identifying information 1302 to the media-identifying information storage means 1312 (1404).

The control means 1316 reads the conversion information 1303 from the DVD-ROM 1301 using the DVD-ROM drive 1315 (1405), relates it to the media-identifying information 1302 and stores the conversion information 1303 in the conversion information storage means 1313 (1406), and the processing to register the conversion information 1303 is terminated (1407).

It is needless to say that the same effect can be obtained in a system as explained in the second embodiment, i.e. in a system where "conversion is not carried out immediately when the information is specified from the user, and the information as specified is acquired first, and if the information is a script, conversion is carried out".

To facilitate explanation, it is supposed in the present embodiment that the conversion information is acquired from the DVD-ROM 1301 as shown in FIG. 13, while it is not limited to this, and it may be acquired from any of floppy disk ("FD"), CD-ROM, MO, regardless of whether it is of read-only type or rewritable type so far as it is a portable storage medium. In this case, the media-identifying information capable to uniquely specify type and content of the portable storage medium can be substituted by volume label in case of FD and by a title in case of CD-ROM.

The DVD-ROM drive 1315 is used in the present embodiment as the means for driving the portable storage medium, while it is not limited to this, and any means can be adopted, which can normally drive the portable storage medium such as FD drive, CD-ROM drive or MO drive.

As described above, in the present embodiment, the media-identifying information is possessed by the portable storage medium where the conversion information is recorded, and by effectively utilizing this, the same effect as in the fourth embodiment can be obtained, and it is possible to avoid duplication of registration, i.e. to newly register the conversion information which is already registered. Thus, the effects in practical application are enormous.

7th Embodiment

Next, description will be given on an example of the conversion information stored by the conversion information storage means in the information providing system of the sixth embodiment.

Table 4 represents an example of content stored by the media-identifying information storage means in the information providing system as explained in sixth embodiment.

TABLE 4

| Media-identifying information |
| --- |
| #000001 |
| #000002 |
| #000003 |
| #000005 |
| #000009 |
| #000200 |
| ... |

From Table 4, it is evident that 6 DVD-ROMs each having one of the media-identifying information of #000001, #000002, #000003, #000005, #000009, and #000200 have been set in the DVD-ROM drive 1315 of the information providing system 1310 in FIG. 13.

Table 5 shows an example of content of the conversion information stored by the conversion information storage means in the information providing system explained in the sixth embodiment.

TABLE 5

| Conversion candidate address | Media possession | Source |
| --- | --- | --- |
| file:///#000001/data/image/A | YES | #000001 |
| file:///#000001/data/video/B | YES | #000001 |
| file:///#000002/data/image/C | YES | #000001 |
| file:///#000002/data/audio/D | YES | #000001 |
| file:///#000012/data/text/E | NO | #000003 |
| file:///#000005/info/F | YES | #000003 |
| file:///#000005/info/G | YES | #000005 |
| file:///#000009/avi/H | YES | #000009 |
| file:///#000010/data/audio/I | NO | #000009 |
| http://remotehost/J | — | #000009 |
| http://remotehost/K | — | #000009 |
| http://remotehost/L | — | #000200 |
| ... | | |

In Table 5, "media possession" indicates whether a conversion candidate is present or not in the portable storage medium having the media-identifying information, which is stored in the media-identifying information storage means. In the present embodiment, the fact that it is stored in the media-identifying information storage means indicates that it has been set in the DVD-ROM drive 1315, i.e. the user possesses the portable storage medium having the media-identifying information or it is a medium relatively easily obtained. If "yes" is entered in the column of "media possession", it means that the conversion candidate is an effective information. If "no" is entered, it means that the conversion candidate is an ineffective information.

Also, the "source" indicates that the conversion information has been acquired from the media-identifying information given in that column. For each group acquired, the conversion information can be classified in group.

Explaining the content, the first line in the table indicates that it is the conversion information acquired from the portable storage medium having the media-identifying information of #000001. This is evident from the "source" column. From the column of "conversion candidate", it is evident that it is an information called A in a directory of "/data/image" of a portable storage medium having media-identifying information of #000001. Because the media-identifying information #000001 is stored in the media-identifying information storage means, it is known from the column of "media-possession" where "yes" is entered that the conversion candidate is an effective information.

From the fifth line in the table, it is known from the "source" column that it is a conversion information acquired from a portable storage medium having a media-identifying information of #000003. Also, from the column of "conversion candidate", it is known that it indicates an information called E in a directory of "/data/text" of a portable storage medium having a media-identifying information of #000012. Because the media-identifying information #000012 is not stored in the media-identifying information storage means, and "no" is entered in the column of "media possession", it is evident that the conversion candidate is an ineffective information.

In each of the tenth line to the twelfth line, a symbol "-" is entered in the column of "media possession". This is because the conversion candidate is a remote host, i.e. it is present on the network. If it is possible to unconditionally have access to any server, "yes" may be entered automatically. On the other hand, if the accessible servers are limited, as supplemented in the explanation of the fifth embodiment, it is possible to judge each of the conversion candidate whether it is effective or not by combining with the mode where accessible servers on the network are stored.

As described above, in the present embodiment, the fact that media-identifying information is stored indicates that the portable storage medium having the stored media-identifying information has been set in the system of the user, i.e. the user possesses the portable storage medium or the user is under the condition relatively easier to acquire. In association with this, it is possible to judge whether the conversion candidate of the conversion information acquired by the information providing system possesses the media-identifying information stored in the media-identifying information storage means or not, and it is possible to judge whether the information indicated by the conversion candidate is effective to the user or not.

Because it is possible to judge which media-identifying information the portable storage medium has, from which the conversion information acquired by the information providing system has been acquired, the conversion information can be classified in group and controlled, and its effects in practical application are enormous such as the application to updating of the conversion information as described later.

8th Embodiment

Next, detailed description will be given on drive name of the information providing system of an eighth embodiment and on function of drive name storage means.

Figure 15:
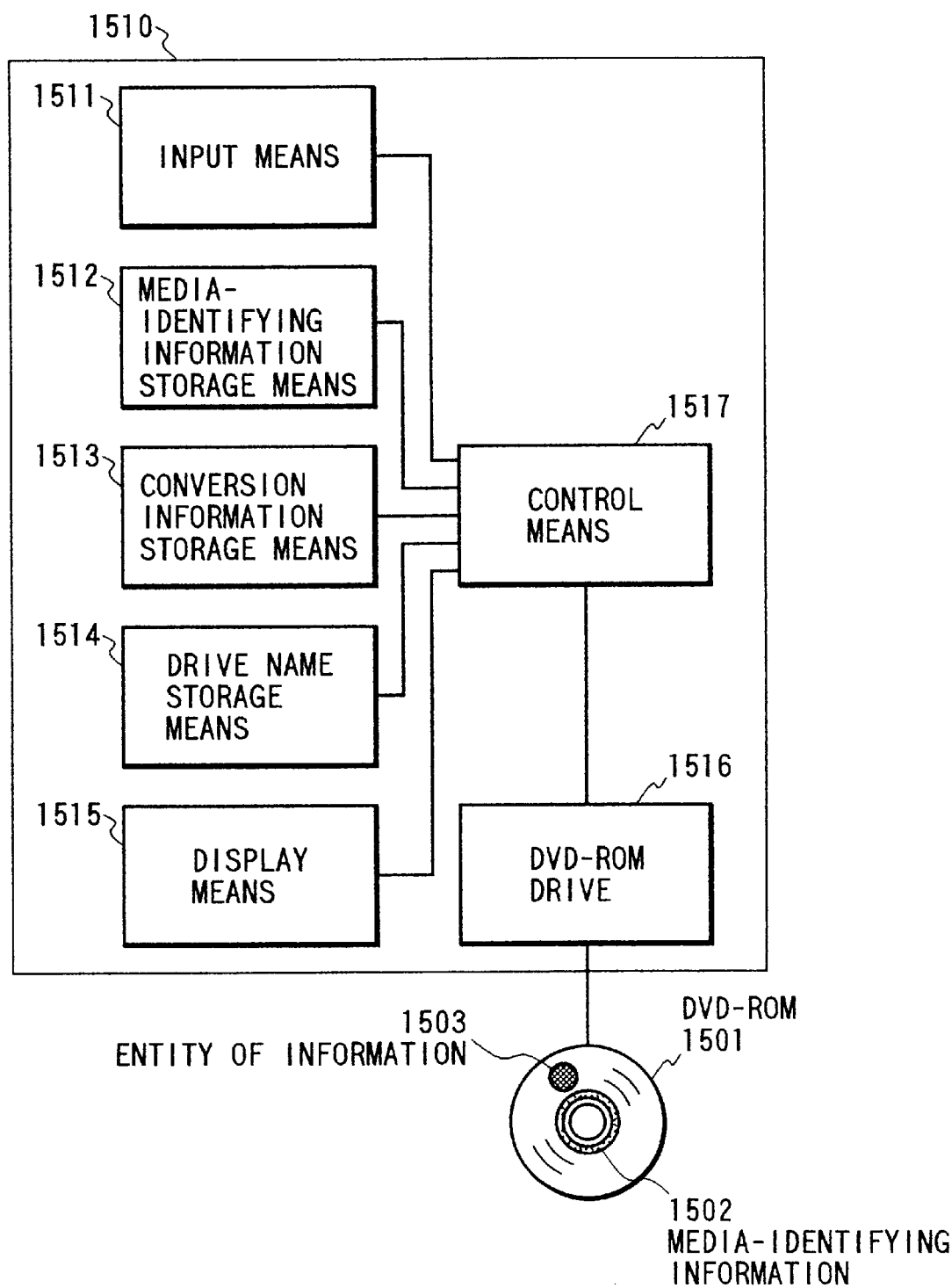
FIG. 15 is a schematical block diagram of an information providing system in an eighth embodiment of the present invention.

FIG. 15 shows an arrangement of an information providing system in the eighth embodiment of the present invention.

In FIG. 15, reference numeral 1501 represents a DVD-ROM, 1502 is a media-identifying information, which can uniquely specify type and content of the DVD-ROM 1501, 1503 is an entity of information, which is a part of the DVD-ROM 1501, 1510 is an information providing system for providing information to users, 1511 is input means such as keyboard, mouse, voice recognizer, tablet, pen, etc., by which the user inputs data, 1512 is media-identifying information storage means for storing the media-identifying information 1502 of the DVD-ROM 1501, 1513 is conversion information storage means for storing previous conversion information or new conversion information, 1514 is drive name storage means for storing drive name, which can uniquely indicate the DVD-ROM drive 1516 in the system by relating it with the media-identifying information 1502 of the DVD-ROM 1501 when the DVD-ROM 1501 is set to the DVD-ROM drive 1516, 1515 is display means such as display unit, by which the information providing system 1510 displays information to users, 1516 is a DVD-ROM drive for driving the DVD-ROM 1501, and 1517 is control means for controlling the input means 1511, the media-identifying information storage means 1512, the conversion information storage means 1513, the drive name storage means 1514, the display means 1515, and the DVD-ROM drive 1516.

Figure 16:
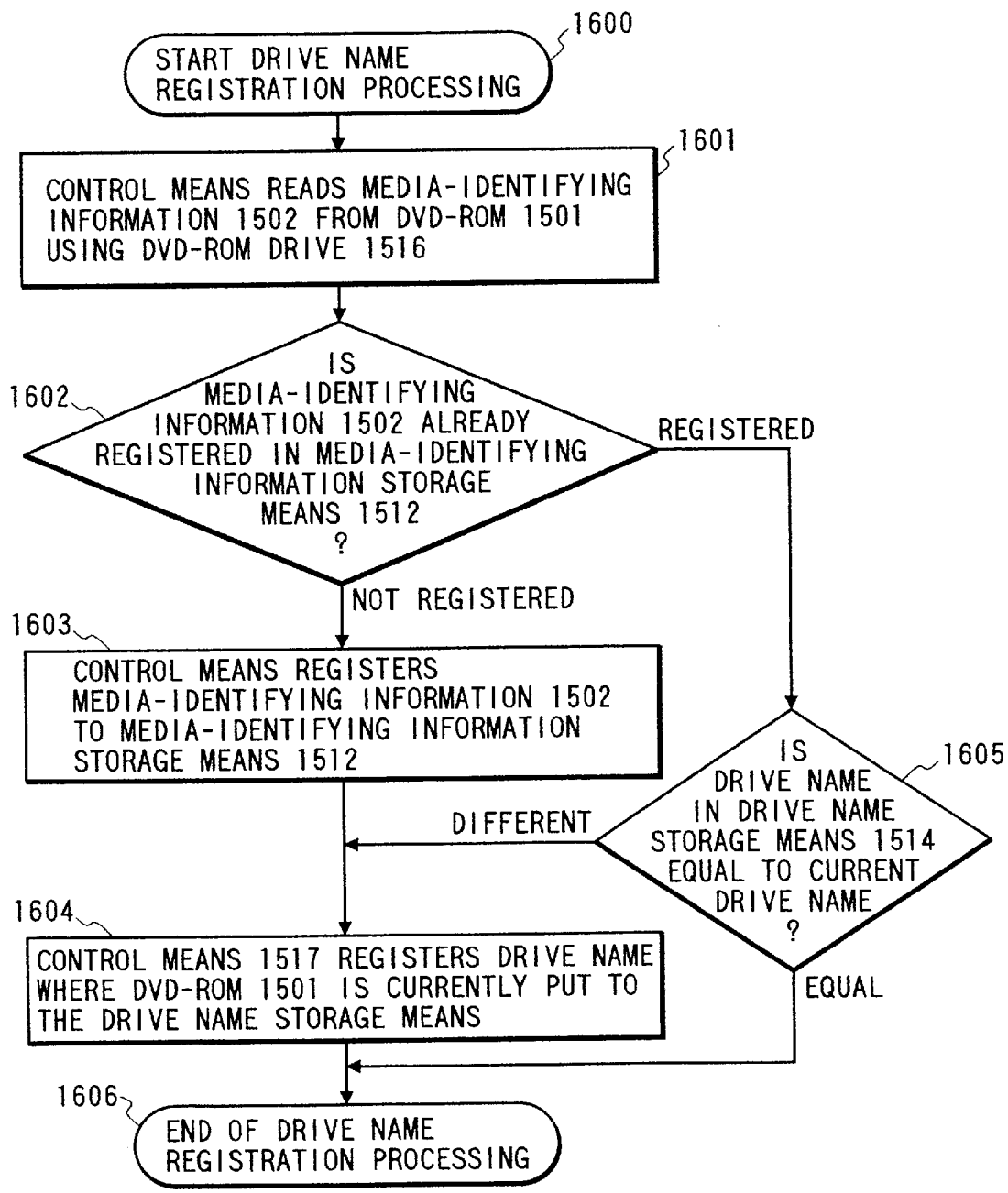
FIG. 16 is a flow chart showing flow of processing to store drive name in the eighth embodiment of the present invention.

FIG. 16 is a flow chart showing flow of processing to store drive name in the eighth embodiment of the present invention.

Figure 17:
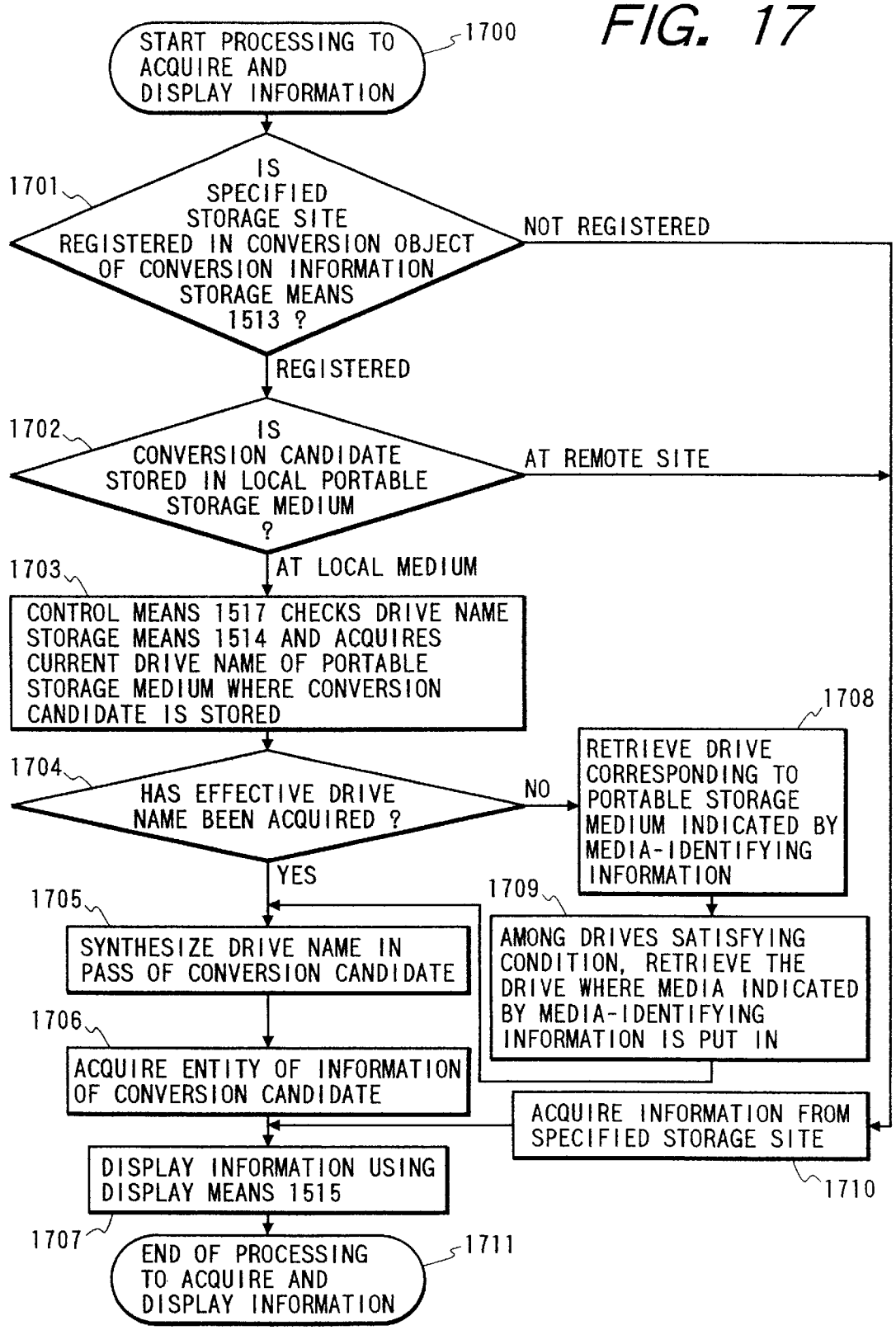
FIG. 17 is a flow chart showing flow of processing to synthesize drive name in the eighth embodiment of the present invention.

FIG. 17 is a flow chart showing the flow of processing to synthesize drive name (absolute path) in the eighth embodiment of the present invention.

Table 6 shows an example of content stored by the drive name storage means in the eighth embodiment of the invention.

TABLE 6

| Drive name | Media-identifying information |
|---|---|
| e | #000001 |
| f | #000002 |
| g | #000003 |

From Table 6, it is evident that a portable storage medium having media-identifying information of #000001 is set in the drive "e" of the system in the present embodiment, a portable storage medium having media-identifying information of #000002 in the drive "f", and that of #000003 in the drive "g".

Table 7 shows an example of content stored by the media-identifying information storage means in case there is no drive name storage means.

TABLE 7

| Media identifying information |
|---|
| #000001 (e) |
| #000002 (f) |
| #000003 (g) |
| #000005 (-) |
| #000009 (-) |
| #000200 (-) |
| ... |

Therefore, by substituting the media-identifying information at the foremost position of description of storage site of the conversion candidate file shown in Table 5, it is possible to convert from the form:

000001/data/image/A, the presence of which can be identified only at the storage site in the portable storage medium having the media-identifying information #000001 if it is a conversion candidate file described in absolute path uniquely specified in the system, e.g. in the first line of Table 4, to the absolute path:

e:/data/image/A, which can be uniquely specified in the system where the portable storage medium is utilized.

In the following, description will be given on the flow of processing in the present embodiment referring to FIG. 15 to FIG. 17.

In case the drive name is stored, and when the DVD-ROM 1501 is set to the DVD-ROM drive 1516, the control means detects it and starts registration processing (1600).

The control means 1517 reads the media-identifying information 1502 from the DVD-ROM 1501 using the DVD-ROM drive 1516 (1601) and checks whether the information of the portable storage medium shown by the media-identifying information 1502 is registered or not among the information stored in the media-identifying information storage means 1512 (1602).

If not registered yet, the control means 1517 stores the media-identifying information 1502 in the media-identifying information storage means 1512 (1603) and acquires drive name where the DVD-ROM 1501 is currently put in. This is related to the media-identifying information 1502 and is registered in the drive name storage means 1514 (1604), and the registration processing is terminated (1606).

On the other hand, in case the media-identifying information 1502 of the DVD-ROM 1501 is registered in the media-identifying information storage means 1512, it is indicated that the DVD-ROM 1501 was set into the DVD-ROM drive 1516 in the past, and the control means 1517 does not register the media-identifying information 1502, and the drive name corresponding to the media-identifying information 1502 is compared with the drive name where the DVD-ROM 1501 is currently put in (1605).

If the drive names are equal to each other, it is judged that there is no need to set the drive name again, and registration processing is terminated (1606). If the drive names are not equal to each other, the drive name where the DVD-ROM 1501 is currently put is registered in the drive name storage means 1514 (1604), and registration processing is terminated (1606).

Next, description will be given on the flow of processing to synthesize the stored drive name, i.e. to set absolute path.

When the user specifies the storage site of necessary information using the input means 1511 of the information providing system 1510 (1700), the control means 1517 checks whether this storage site is registered or not in the conversion object of the conversion information storage means 1513 (1701).

If it is not registered, it is checked in Step 1701 whether the conversion candidate is stored in the local portable storage medium or in an information server on a remote network (1702).

In Step 1702, if it is stored in a local portable storage medium, the control means 1517 retrieves the drive name storage means 1514 by the media-identifying information of the portable storage medium including the conversion candidate corresponding to this conversion object. The drive name where the portable storage medium is put in is acquired (1703), and it is advanced to Step 1704.

In Step 1704, if an effective drive name is obtained, it is advanced to Step 1705. If not obtained, i.e. if the drive name is ineffective, the control means 1517 retrieves a drive corresponding to the portable storage medium indicated by the media-identifying information (1708). Of the drives satisfying the condition, the drive name of the drive where the portable storage medium indicated by the media-identifying information is put in is obtained (1709), and it is advanced to Step 1705.

In Step 1705, the storage site and the drive name are synthesized based on the drive name. If there is no corresponding drive or if no corresponding portable storage medium is in the drive, although not shown in FIG. 17, the control means 1517 displays that there is no DVD-ROM drive necessary for acquiring information and gives a message to urge connection of the DVD-ROM drive. When the drive is connected, it is checked whether a DVD-ROM having the media-identifying information corresponding to this drive is put in or not. If it is not put in, a message is issued to urge to put it in.

Next, the information indicated by the absolute path obtained by the synthesis of Step 1705 is acquired (1706), and the acquired information is displayed using the display means 1515 (1707). Then, the processing to acquire and display information is terminated (1711).

In Step 1701, in case the specified information is not registered as conversion object, or in case it is stored in an information server on remote network in Step 1702, the control means 1517 acquires information from the specified storage site (1710), displays the acquired information using the display means 1515 (1707), and the processing to acquire and display information is terminated (1711).

It is needless to say that the same effect can be obtained in a system explained in the second embodiment, i.e. in a system where "conversion is not carried out immediately after the information is specified from the user, and the information as specified is acquired first, and in case the information is a script, conversion is carried out".

In the present embodiment, description has been given on the case where drive name storage means is provided. In case of a system where no drive name storage means is provided, type of medium such as DVD-ROM, CD-ROM, FD, etc. is recognized from the media-identifying information stored in the media-identifying information storage means. Then, the drive name of the driving means corresponding to the type is retrieved, and the retrieved drive name is synthesized to conversion candidate, and this is converted to absolute path name. If there are two or more driving means of the same type, this processing is repeated. As shown in Table 7, if a portable storage medium having the media-identifying information is currently set in the media-identifying information storage means, it should be stored together with the drive name. Then, the same effect can be naturally obtained as in the case where the drive name storage means is provided.

The content of the drive name storage means may be updated when the portable storage medium has been removed from the drive or when another portable storage medium has been set in the drive.

In case the drive name storage means stores the drive name by relating it with the media-identifying information, as shown in Table 6, it may be related as shown in the correspondence table directly with the drive name or a pointer indicating the place where the media-identifying information storage means is present may be provided to the drive name so that it has indirect corresponding relation with the media-identifying information.

As described above, in the present embodiment, the storage site of the conversion candidate is expressed in such manner as not to include the drive name in the system which the user uses in the portable storage medium when it is distributed. As explained in the present embodiment, it is possible to promptly obtain the storage site of correct information of the conversion candidate, i.e. it is possible to eliminate useless processing, i.e. to judge where the portable storage medium indicated by the conversion candidate is present at each time of conversion. This is attained by acquiring the drive name, which can uniquely specify the storage site of the portable storage medium in the system and by storing the drive name. Further, if the corresponding portable storage medium is not set in the drive, a message may be issued to set in the corresponding drive. Thus, the effects in practical application are enormous.

9th Embodiment

Next, detailed description will be given on the case where the conversion information is updated via the network.

Figure 18:
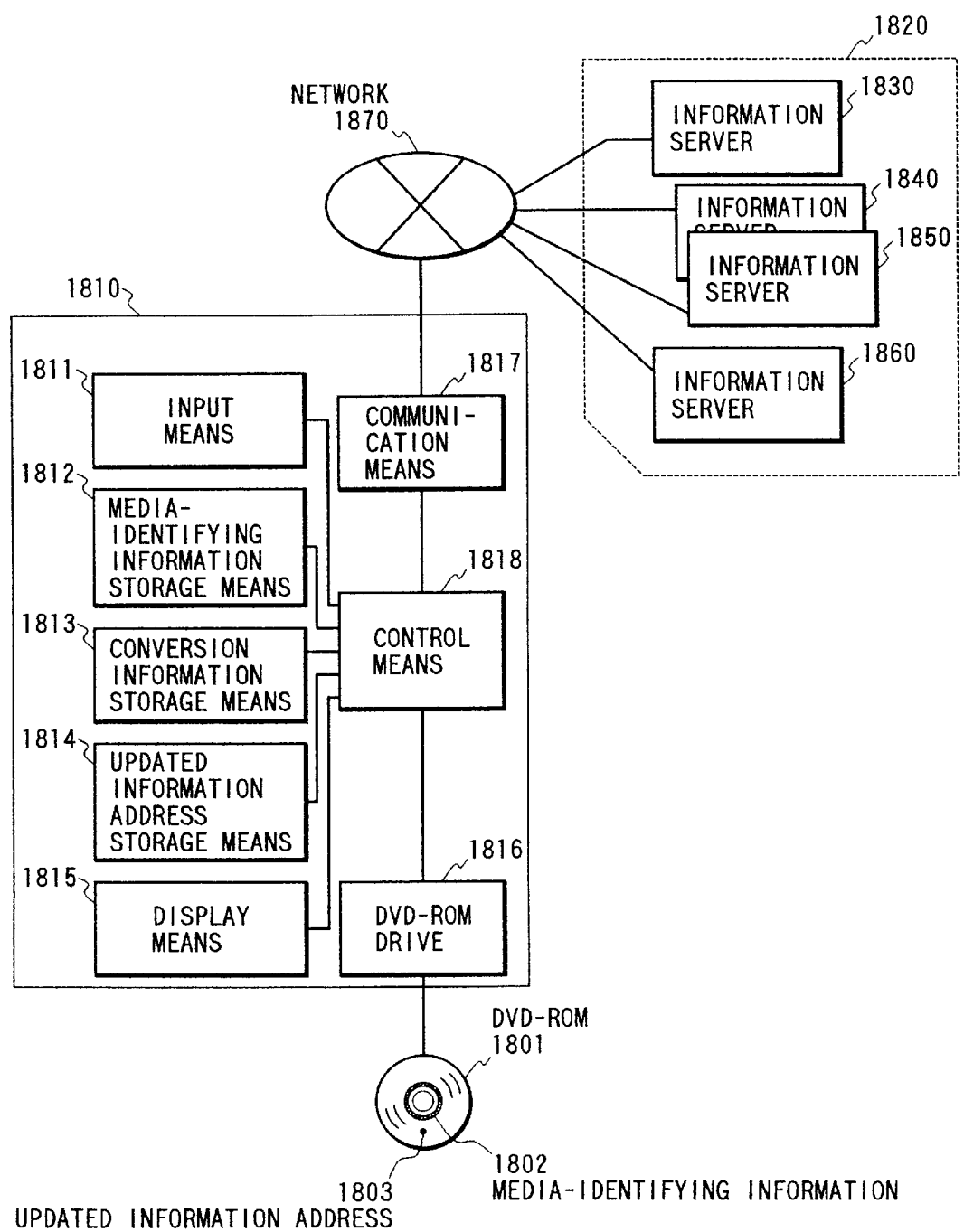
FIG. 18 is a schematical block diagram of an information providing system in a ninth embodiment of the present invention.

FIG. 18 shows an arrangement of an information providing system in a ninth embodiment of the present invention.

In FIG. 18, reference numeral 1801 represents a DVD-ROM, 1802 is a media-identifying information which can uniquely specify type and content of the DVD-ROM 1801, 1803 is an updated information address expressing the storage site of the updated conversion information, which is the newest or additional information or both, 1810 is an information providing system for providing information to users, 1811 is input means such as keyboard, mouse, voice recognizer, tablet, pen, etc., by which the user inputs data, 1812 is media-identifying information storage means for storing the media-identifying information, 1813 is conversion information storage means for storing conversion information, 1814 is updated information address storage means for storing the updated information address 1803, 1815 is display means such as display unit, by which the information providing system 1810 displays information to users, 1816 is a DVD-ROM drive for driving the DVD-ROM 1801, 1817 is communication means, by which the information providing system 1810 transmits and receives information via a network, 1818 is control means for controlling the input means 1811, the media-identifying information storage means 1812, the conversion information storage means 1813, the updated information address storage means 1814, the display means 1815, the DVD-ROM drive 1816, and the communication means 1817, 1820 is an information server group indicating a group of information servers, which can provide specified arbitrary information, reference numerals 1830, 1840, 1850 and 1860 each represents an information server included in the information server group 1820, and 1870 is a network connecting the information providing system 1810 with the information server group 1820.

To facilitate explanation, it is supposed in the present embodiment that the information server 1830 possesses updated conversion information.

Figure 19:
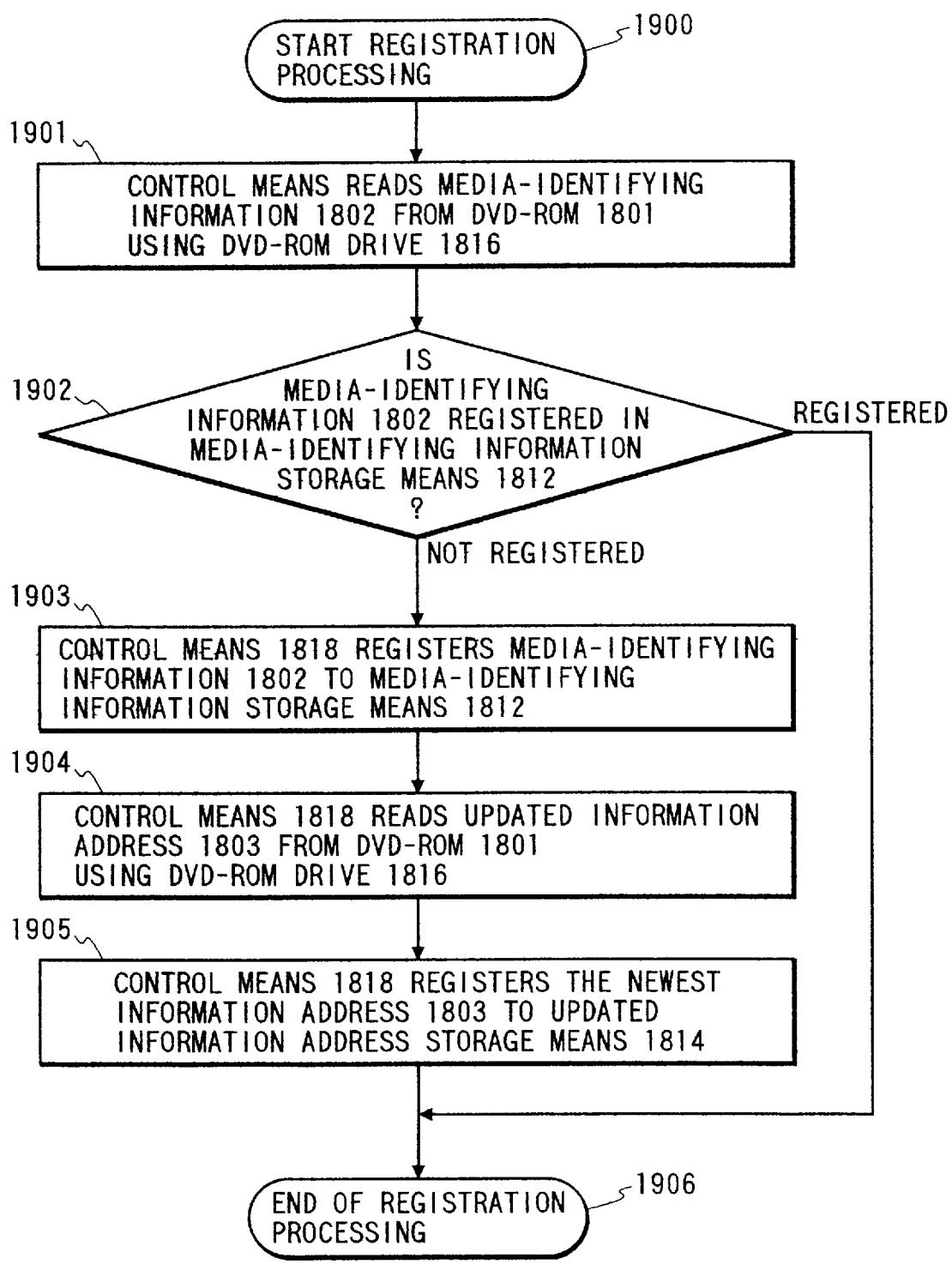
FIG. 19 is a flow chart showing flow of processing to store updated information address in the ninth embodiment of the present invention.

FIG. 19 is a flow chart showing a flow of processing to store the updated information address in the ninth embodiment of the present invention.

Figure 20:
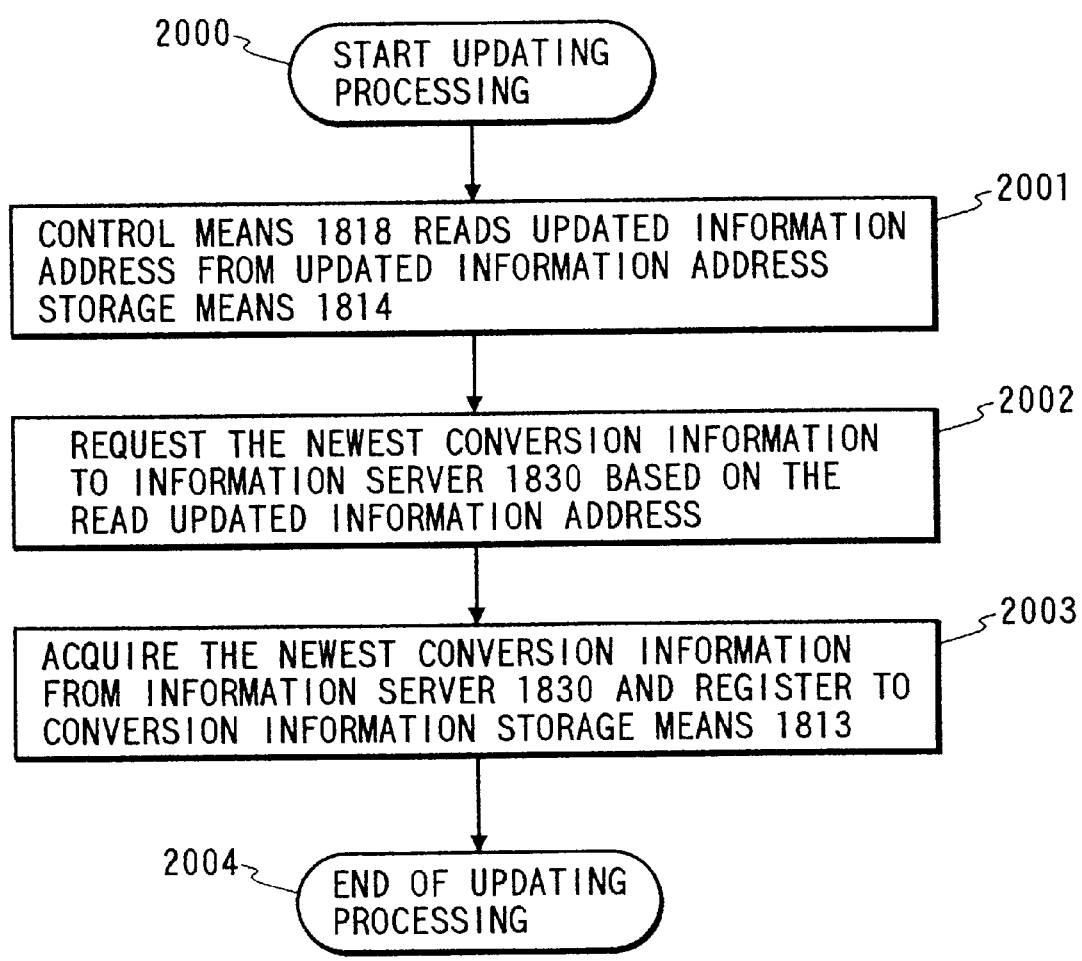
FIG. 20 is a flow chart showing flow of processing to update content of the conversion information storage means in the ninth embodiment of the present invention.

FIG. 20 is a flow chart showing flow of processing to update the conversion information stored in the conversion information storage means in the ninth embodiment of the present invention.

Table 8 shows an example of content of the updated information address recorded by the DVD-ROM 1801.

TABLE 8

Updated information address http://serverA/a
http://serverB/b
http://serverC/c
...

In Table 8, the first line indicates a file called "a" in a server "A" on a network available by a protocol "http".

Table 9 represents an example of content of the updated conversion information retained by the information server 1830.

TABLE 9

| Conversion object address | Conversion candidate address | Source |
|---|---|---|
| http://hostA/001 | file:///#000001/data/image/A | #000001 |
| http://hostB/002 | file:///#000001/data/video/B | #000001 |
| http://hostC/003 | file:///#000002/data/image/C | #000001 |
| http://hostD/004 | file:///#000002/data/audio/D | #000001 |
| http://hostD/005 | file:///#000012/data/text/E | #000003 |
| http://hostD/006 | file:///#000005/info/F | #000003 |
| http://hostE/007 | file:///#000005/info/G | #000005 |
| http://hostF/008 | file:///#000009/avi/H | #000009 |
| http://hostG/009 | file:///#000010/data/audio/I | #000009 |
| http://hostG/010 | http://remotehost/J | #000009 |
| http://hostH/011 | http://remotehost/K | #000009 |
| http://hostI/012 | http://remotehost/L | #000200 |
| ... | ... | |

In Table 9, the "source" column is as already explained in Table 5 of the seventh embodiment, and detailed description is not given here. Here, the first line means that, among the conversion information acquired from the DVD-ROM having media-identifying information #000001, content of the conversion candidate having the conversion object of "http://hostA/001" is updated to "file:///#000001/data/image/A".

In the following, description will be given on the flow of processing in the present embodiment, referring to FIG. 18 and FIG. 19.

When the DVD-ROM 1801 is set in the DVD-ROM drive 1816, the control means 1818 detects it, and registration processing is started (1900).

The control means 1818 reads the media-identifying information 1802 from the DVD-ROM 1801 using the DVD-ROM drive 1816 (1901) and checks whether the media-identifying information 1802 is registered in the media-identifying information storage means 1812 (1902).

If it is already registered, it is judged that the updated information address has been already registered, and the registration processing is terminated (1906).

On the other hand, if the media-identifying information 1802 is not yet registered in the media-identifying information storage means 1812, the control means 1818 registers the media-identifying information 1802 to the media-identifying information storage means 1812 (1903), reads the updated information address 1803 from the DVD-ROM 1801 (1904) and registers it in the updated information address storage means 1814 by relating it with the media-identifying information 1802 (1905). Then, the registration processing is terminated (1906).

Next, when a given time has elapsed after the setting of the conversion information, the control means 1818 starts the processing to update the conversion information (2000).

The control means 1818 reads two or more updated information addresses related with the media-identifying information from the updated information address storage means 1814 (2001).

To each of the sets of the media-identifying information and the updated information address, the control means 1818 checks the corresponding information server from the value of the updated information address, and issues request to this information server, i.e. to the information server 1830 in the present embodiment, so that the corresponding conversion information for updating is sent to the portable storage medium indicated by the media-identifying information (2002).

This request is delivered to the information server 1830 via the network 1870. The information server 1830 transmits conversion information corresponding to the delivered request to the information providing system 1810. The information providing system 1810 registers the newest conversion information sent from the information server 1830 to the conversion information storage means 1813 (2003), and the updating processing is terminated (2004).

It is needless to say that the same effect can be obtained in a system explained in the second embodiment, i.e. in a system where "conversion is not carried out immediately after the information is specified from the user, and the information as specified is acquired first, and in case the information is a script, conversion is carried out".

To facilitate explanation, it is supposed in the present embodiment that the information server group 1820 is a group of four information servers, while the number of the information servers may be one or any number other than 4. That is, the information providing system 1810 is connected to one or more information servers via the network.

As described above, in the present embodiment, the updated information address indicating the storage site of the conversion information for updating on the network is recorded on the portable storage medium, and by setting this portable storage medium to the drive, the conversion information can be automatically updated. Further, by storing two or more updated information addresses in the updated address storage means, the conversion information can be updated by batch processing. The effects in practical application are enormous.

10th Embodiment

Next, description will be given on the case where the conversion information is updated using the portable storage medium.

Figure 21:
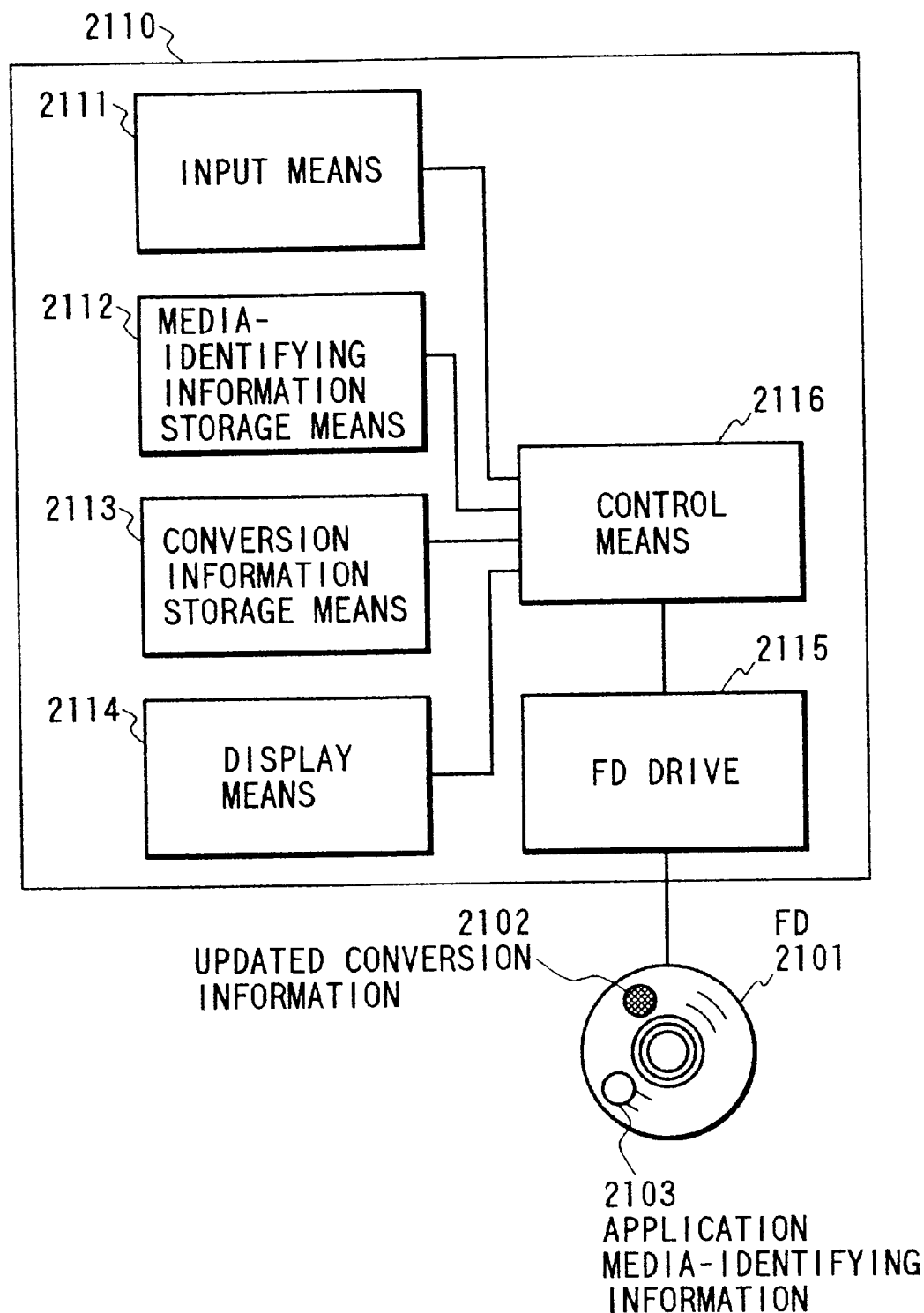
FIG. 21 is a schematical block diagram of an information providing system in a tenth embodiment of the present invention.

FIG. 21 shows an arrangement of an information providing system in a tenth embodiment of the present invention.

In FIG. 21, reference numeral 2101 represents a floppy disk ("FD"), 2102 is an updated conversion information, which is the newest or additional information or both, 2103 is an application media-identifying information indicating the media-identifying information where the updated conversion information 2102 is applied, 2110 is an information providing system for providing information to users, 2111 is input means such as keyboard, mouse, voice recognizer, tablet, pen, etc., by which the user of the information providing system 2110 inputs data, 2112 is media-identifying information storage means for storing the media-identifying information, 2113 is conversion information storage means for storing previous conversion information or new conversion information, e.g. updated conversion information 2102, 2114 is display means such as display unit, by which the information providing system 2110 displays information to users, 2115 is a FD drive for driving the FD 2101, 2116 is control means for controlling the input means 2111, the media-identifying information storage means 2112, the conversion information storage means 2113, the display means 2114, and the FD drive 2115.

Figure 22:
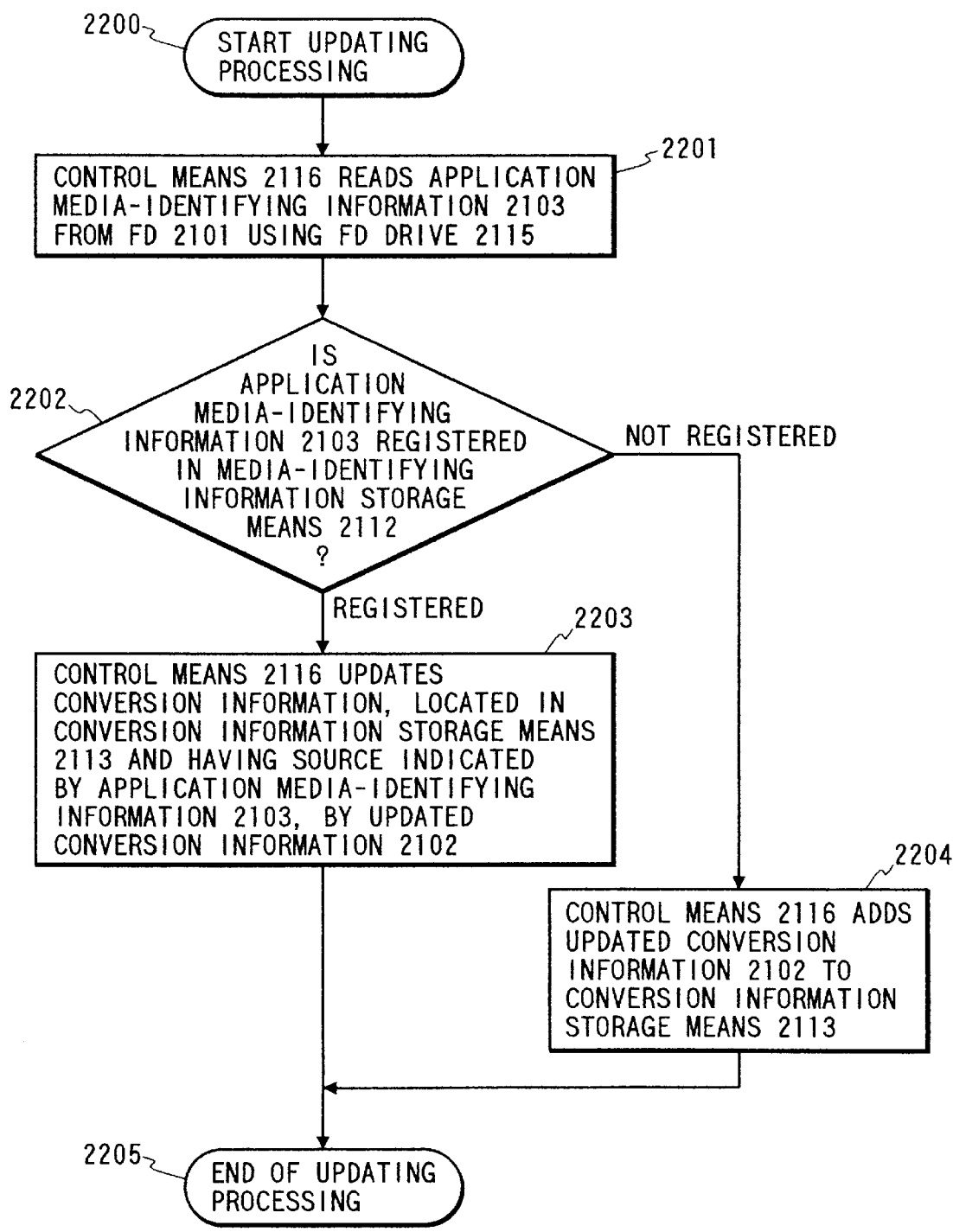
FIG. 22 is a flow chart showing flow of processing of an information providing system in the tenth embodiment of the present invention.

FIG. 22 is a flow chart showing flow of processing in the information providing system in the tenth embodiment of the present invention.

Table 10 shows an example of content of the application media-identifying information 2103 of the FD 2101. It is evident from the table that the updated conversion information 2102 of the FD 2101 is applied to the conversion information corresponding to the media-identifying information of #000001.

TABLE 10

| Application media-identifying information |
|---|
| #000001 |

Table 11 represents an example of content of the updated conversion information 2102 of the FD 2101.

TABLE 11

| Conversion object address | Conversion candidate address |
|---|---|
| http://hostA/001 | file:///#000001/data/image/X |
| http://hostB/002 | file:///#000001/data/video/Y |
| http://hostC/003 | file:///#000002/data/image/Z |
| http://hostD/004 | file:///#000002/data/audio/XYZ |

Table 12 represents a part of an example of content of the conversion information stored by the conversion information storage means 2113.

TABLE 12

| Conversion object address | Conversion candidate address | Source |
|---|---|---|
| http://hostA/001 | file:///#000001/data/image/A | #000001 |
| http://hostB/002 | file:///#000001/data/video/B | #000001 |
| http://hostC/003 | file:///#000002/data/image/C | #000001 |
| http://hostD/004 | file:///#000002/data/audio/D | #000001 |
| http://hostD/005 | file:///#000012/data/text/E | #000003 |
| http://hostD/006 | file:///#000005/info/F | #000003 |
| ... | ... | |

Table 13 shows a part of an example of content of the conversion information of the conversion information storage means 2113 updated by the updated conversion information 2102.

TABLE 13

| Conversion object address | Conversion candidate address | Source |
|---|---|---|
| http://hostA/001 | file:///#000001/data/image/X | #000001 |
| http://hostB/002 | file:///#000001/data/video/Y | #000001 |
| http://hostC/003 | file:///#000002/data/image/Z | #000001 |
| http://hostD/004 | file:///#000002/data/audio/XYZ | #000001 |
| http://hostD/005 | file:///#000012/data/text/E | #000003 |
| http://hostD/006 | file:///#000005/info/F | #000003 |
| ... | ... | |

From Tables 10 to 13, it is evident that, among the conversion information stored in the conversion information storage means 2113, the points (the first line to the fourth line in Table 12) corresponding to #000001 (Table 1) indicated by the application media-identifying information 2103 in the "source" is updated (Table 13) as indicated by the updated conversion information 2102 (Table 11).

In the following, description will be given on the flow of processing in the present embodiment referring to FIG. 21 and FIG. 22.

When the FD 2101 is set in the FD drive 2115, the control means 2116 judges that it is updating processing of the conversion information because the FD 2101 has the application media-identifying information 2103, and updating processing is started (2200).

The control means 2116 reads the application media-identifying information 2103 of the FD 2101 using the FD drive 2115 (2201) and checks whether the media-identifying information indicated by the application media-identifying information 2103 is already registered or not in the media-identifying information storage means 2112 (2202).

If it is already registered, among the conversion information registered in the conversion information storage means 2113, the conversion information corresponding to this media-identifying information is replaced with the updated conversion information 2102 (2203), and updating processing is terminated (2205).

On the other hand, if the media-identifying information indicated by the application media-identifying information 2103 is not registered in the media-identifying information storage means 2112, the control means 2116 judges that the portable storage medium having the entity of information indicated by the media-identifying information has not been set in the FD drive 2115 of the information providing system 2110, regards the updated conversion information 2102 of the FD 2101 as new information and additionally registers it in the conversion information storage means (2204). Then, the updating processing is terminated (2205). When it is judged that it has not been set in the FD drive 2115, and it is set so that there is no need to update the conversion information, the updating processing may be forcibly terminated.

It is needless to say that the same effect can be obtained in a system explained in the second embodiment, i.e. in a system where "conversion is not carried out immediately when information is specified from the user, and the information as specified is acquired first, and in case the information is a script, conversion is carried out".

To facilitate explanation, it is supposed in the present embodiment that FD is used as the portable storage medium for updating, while any of DVD-ROM, CD-ROM, MO, may be used regardless of whether it is of read-only type or rewritable type so far as it is a portable storage medium.

As the driving means for driving the portable storage medium for updating, FD drive is used, while it is not limited to this, and any means for normally driving the above portable storage medium such as DVD-ROM drive, CD-ROM drive, or MO drive may be used.

As described above, in case it is desired to update the conversion information in a system not connected with the network, it is possible to update the conversion information corresponding to the application media-identifying information by preparing at least a portable storage medium where the updated conversion information and the application media-identifying information are recorded. Because the portable storage medium where the updated conversion information is recorded does not have to possess the media-identifying information, and this is also applicable to a conversion type portable storage medium having no media-identifying information. Thus, the effects in practical application are enormous.

11th Embodiment

Next, detailed description will be given on the case where the conversion information is replaced with the new version as an example of updating using the information called "version information".

Figure 23:
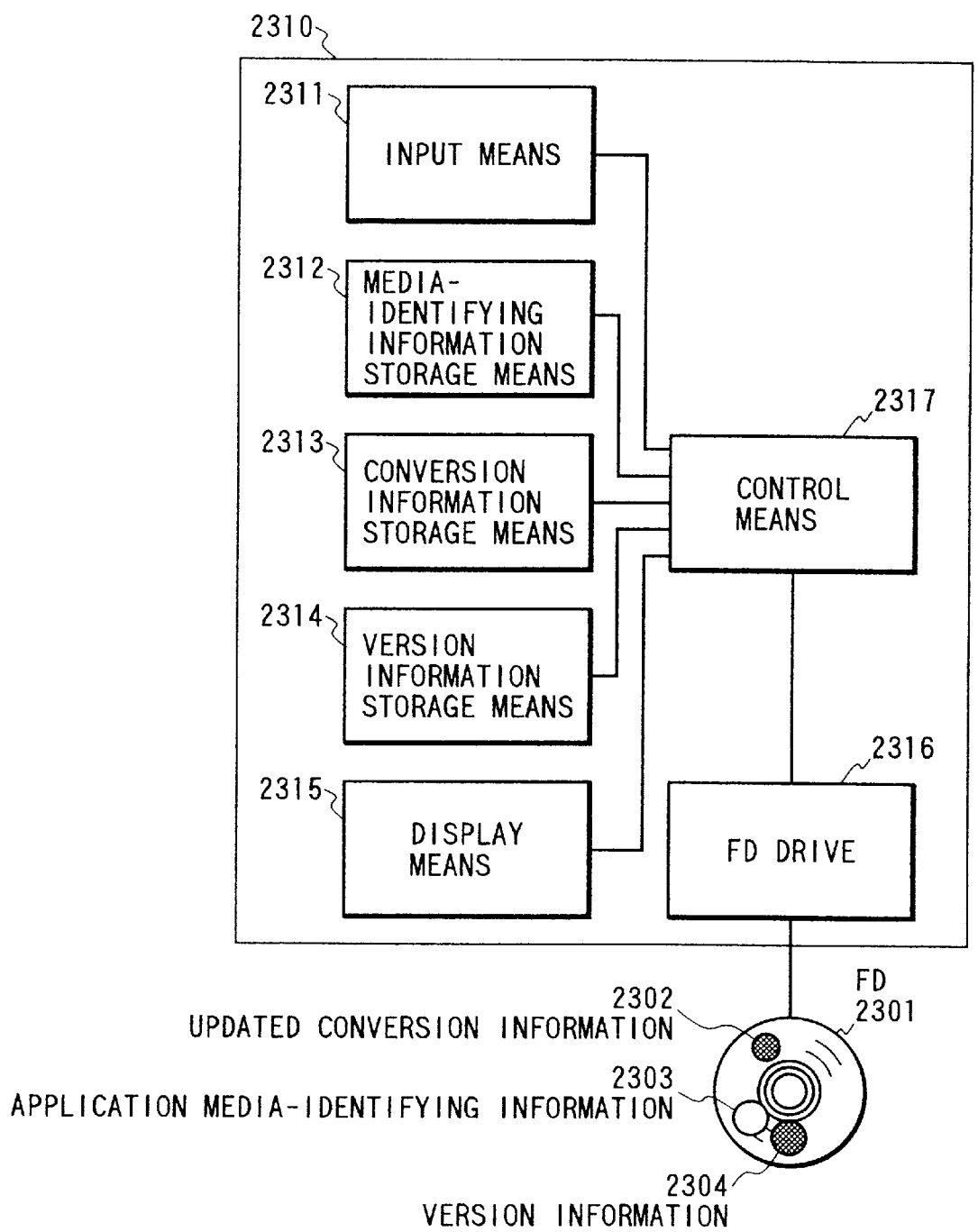
FIG. 23 is a schematical block diagram of an information providing system in an eleventh embodiment of the present invention.

FIG. 23 shows an arrangement of an information providing system in an eleventh embodiment of the present invention.

In FIG. 23, reference numeral 2301 represents a floppy disk ("FD"), 2302 is an updated conversion information, which is the newest or additional information or both, 2303 is an application media-identifying information indicating the media-identifying information where the updated conversion information 2302 is applied, 2304 is a version information expressing a version of the updated conversion information, 2310 is an information providing system for providing information to users, 2311 is input means such as keyboard, mouse, voice recognizer, tablet, pen, etc., by which the user of the information providing system 2310 inputs data, 2312 is media-identifying information storage means for storing the media-identifying information, 2313 is conversion information storage means for storing previous conversion information or new conversion information, e.g. updated conversion information 2302, 2314 is version information storage means for storing previous version information or new version information, e.g. the version information 2303, 2315 is display means such as display unit, by which the information providing system 2310 displays information to users, 2316 is a FD drive for driving the FD 2301, and 2317 is control means for controlling the input means 2311, the media-identifying information storage means 2312, the conversion information storage means 2313, the version information storage means 2314, the display means 2315, and the FD drive 2316.

Figure 24:
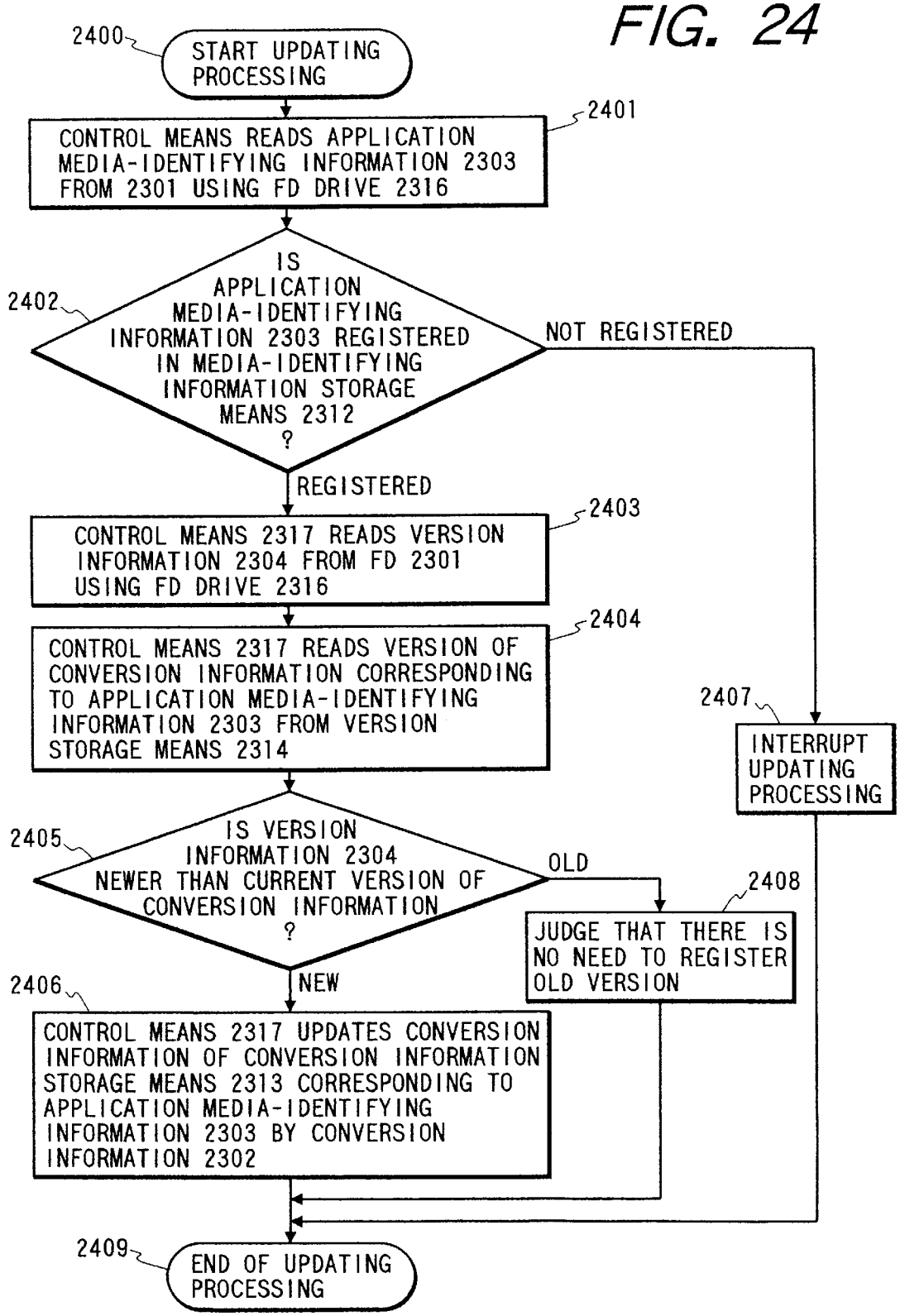
FIG. 24 is a flow chart showing flow of processing of an information providing system in the eleventh embodiment of the present invention.

FIG. 24 is a flow chart showing flow of processing of an information providing system in the eleventh embodiment of the present invention.

Table 14 shows an example of content of the version information 2304 of the FD 2301.

TABLE 14

| Version information |
|---|
| 2.1 |

Table 15 represents a part of an example of content showing corresponding relation between the conversion information stored by the conversion information storage means 2313 and the version information stored by the version information storage means 2314.

TABLE 15

| Conversion object address | Conversion candidate address | Source | Version |
|---|---|---|---|
| http://hostA/001 | file:///#000001/data/image/A | #000001 | 1.0 |
| http://hostB/002 | file:///#000001/data/video/B | #000001 | 1.0 |
| http://hostC/003 | file:///#000002/data/image/C | #000001 | 1.0 |
| http://hostD/004 | file:///#000002/data/audio/D | #000001 | 1.0 |

TABLE 15-continued

| Conversion object address | Conversion candidate address | Source | Version |
|---|---|---|---|
| http://hostD/005 | file:///#000012/data/text/E | #000003 | 2.0 |
| http://hostD/006 | file:///#000005/info/F | #000003 | 3.0 |
| ... | ... | | |

Table 16 represents a part of an example of content showing corresponding relation between the conversion information of the conversion information storage means 2313 after updated by the updated conversion information 2302 and the version information of the version information storage means 2314.

TABLE 16

| Conversion object address | Conversion candidate address | Source | Version |
|---|---|---|---|
| http://hostA/001 | file:///#000001/data/image/X | #000001 | 2.1 |
| http://hostB/002 | file:///#000001/data/video/Y | #000001 | 2.1 |
| http://hostC/003 | file:///#000002/data/image/Z | #000001 | 2.1 |
| http://hostD/004 | file:///#000002/data/audio/XYZ | #000001 | 2.1 |
| http://hostD/005 | file:///#000012/data/text/E | #000003 | 2.0 |
| http://hostD/006 | file:///#000005/info/F | #000003 | 3.0 |
| ... | ... | | |

To facilitate explanation, it is supposed that the content of the updated conversion information 2302 is the same as in Table 10, and the content of the application media-identifying information is the same as in Table 9.

From Tables 10, 11 and 14 to 16, it is known that, among the conversion information stored in the conversion information storage means 2313, the versions (the first line to the fourth line in Table 15) on the points corresponding to #000001 (Table 10) indicated by the application media-identifying information 2303 in the "source" column are converted to the versions (Table 14) as indicated by the updated conversion information 2302 and the version information 2304 (Table 16).

In the following, description will be given on the flow of processing in the present embodiment referring to FIG. 23 and FIG. 24.

When the FD 2301 is set in the FD drive 2316 of the information providing system 2310, the control means 2317 starts the processing to update the conversion information (2400).

First, the control means 2317 reads the application media-identifying information 2303 from the FD 2301 using the FD drive 2316 (2401) and checks whether the application media-identifying information 2303 is registered in the media-identifying information storage means 2312 (2402).

If it is registered, the control means 2317 reads the version information 2304 from the FD 2301 using the FD drive 2316 (2403) and reads the version of the conversion information corresponding to the application media-identifying information 2303 from the version storage means 2314 (2404), and it is checked whether the version information 2304 of the updated conversion information 2302 in the FD 2301 is registered in the current version information storage means 2314, i.e. whether it is newer than the conversion information corresponding to this media-identifying information or not (2405).

If it is new, the control means 2317 updates the conversion information of the conversion information storage means 2313 corresponding to the application media-identifying information 2303 by the updated conversion information 2302 (2406), and the updating processing is terminated (2409).

In Step 2402, if the media-identifying information of the application media-identifying information 2303 is not registered in the media-identifying information storage means 2312, the control means 2317 judges that the portable storage medium having the entity of information corresponding to the updated conversion information 2320 has not been set in the FD drive 2316 and interrupts the updating processing (2407). Thus, without newly registering the conversion information, the updating processing is terminated (2409). In Step 2407, the updated conversion information 32302 of the FD 2301 may be newly registered instead of interrupting the updating processing.

In Step 2405, if the version information 2304 of the conversion information 2302 in the FD 2301 is registered in the version information storage means 2314, i.e. if it is equal to or older than the conversion information corresponding to this media-identifying information, the control means 2317 judges that there is no need to newly register the information of the same or older version (2408), and the updating processing is terminated without updating the conversion information (2409).

In case the newest conversion information is read from the information server via the network as described in the tenth embodiment the version information relating to the conversion information for updating retained by the information server may be given to the information server side, and the version information relating to the conversion information stored in the conversion information storage means may be given to the information providing system side, and the same effect can be obtained.

It is needless to say that the same effect can be obtained in a system explained in the second embodiment, i.e. in a system where "conversion is not carried out immediately after the information is specified from the user, and the information as specified is acquired first, and in case the information is a script, conversion is carried out".

To facilitate explanation, FD is used in the present embodiment as the portable storage medium for updating, while it is not limited to this, and any portable storage medium such as DVD-ROM, CD-ROM, MO may be used regardless of whether it is of read-only type or rewritable type.

In the present embodiment, FD drive is used as the driving means for the portable storage medium, while it is not limited to this, and any means for normally driving a storage medium corresponding to the above portable storage medium may be used such as DVD-ROM drive, CD-ROM drive, MO drive, etc.

As described above, it is possible according to the present embodiment to update the conversion information including replacement with the newest conversion information or addition of the newest conversion information, or in case the version 3 is possessed and it is tried to update it to the version 2, updating processing is stopped because it is meaningless, and the older version is additionally registered by providing the version information. Further, in the control of the conversion information, the beginners can perform rough setting while skilled operator can perform elaborate setting. The effects in practical application are enormous.

12th Embodiment

Next, detailed description will be given as to how to convert in case there are two or more conversion candidates using an example.

Figure 25:
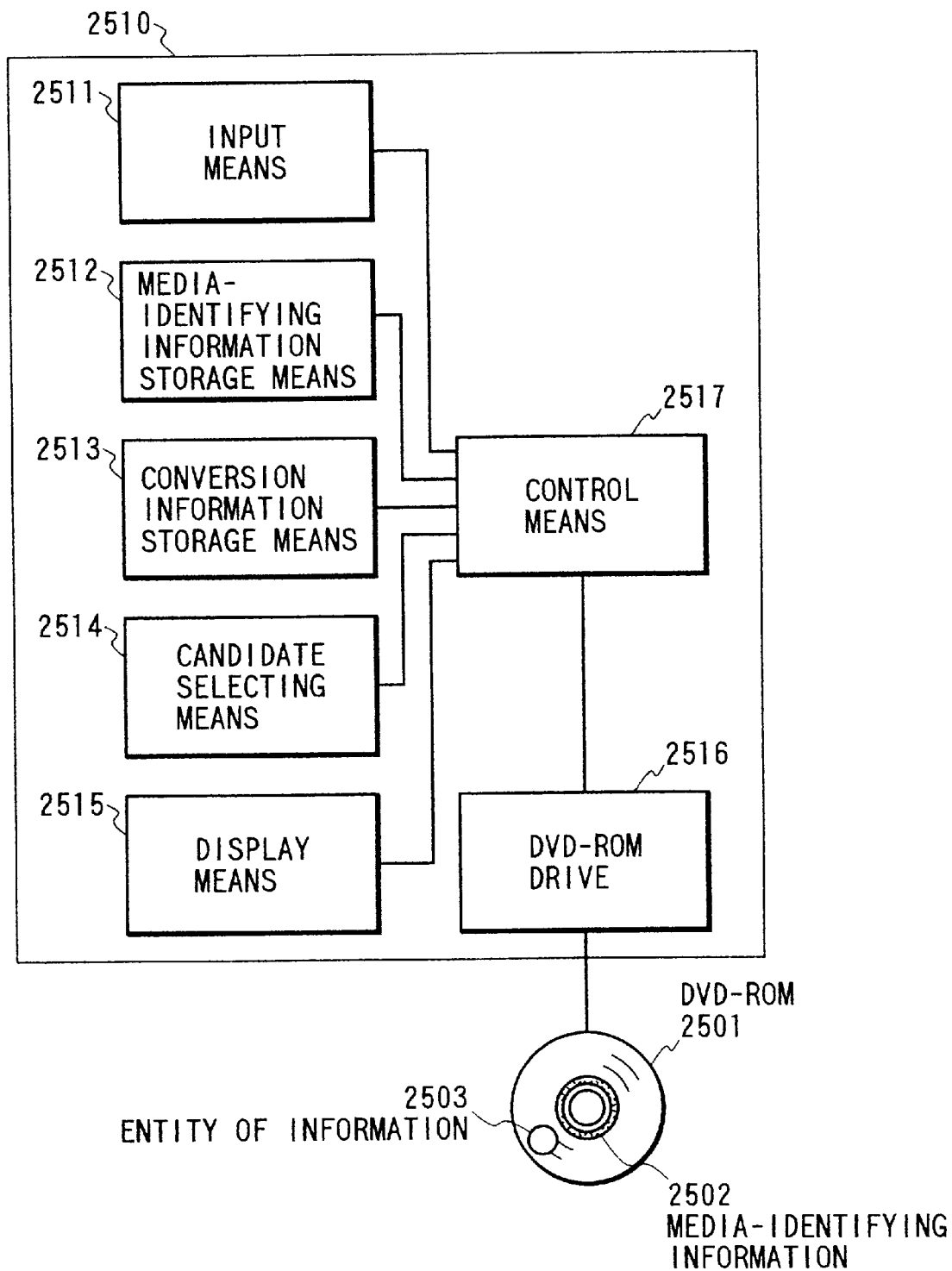
FIG. 25 is a schematical block diagram of an information providing system in a twelfth embodiment of the present invention.

FIG. 25 shows an arrangement of an information providing system in a twelfth embodiment of the present invention.

In FIG. 25, reference numeral 2501 represents a DVD-ROM, 2502 is a media-identifying information capable to uniquely specify type and content of the DVD-ROM 2501, 2503 is an entity of information, which is a part of content of the DVD-ROM 2501, 2510 is an information providing system for providing information to users, 2511 is input means such as keyboard, mouse, voice recognizer, tablet, pen, etc., by which the user of the information providing system 10 inputs data, 2512 is media-identifying information storage means for storing previous media-identifying information or new media-identifying information, e.g. the media-identifying information 2502 or the DVD-ROM 2501, 2513 is conversion information storage means for storing previous conversion information or new conversion information, 2514 is candidate selecting means for selecting a candidate suitable for the situation based on an arbitrary rule from two or more conversion candidates, 2515 is display means such as display unit, by which the information providing system 2510 displays information for users, 2516 is a DVD-ROM drive for driving the DVD-ROM 2501, and 2517 is control means for controlling the input means 2511, the media-identifying information storage means 2512, the conversion information storage means 2513, the candidate selecting means 2514, the display means 2515, and the DVD-ROM drive 2516.

Figure 26:
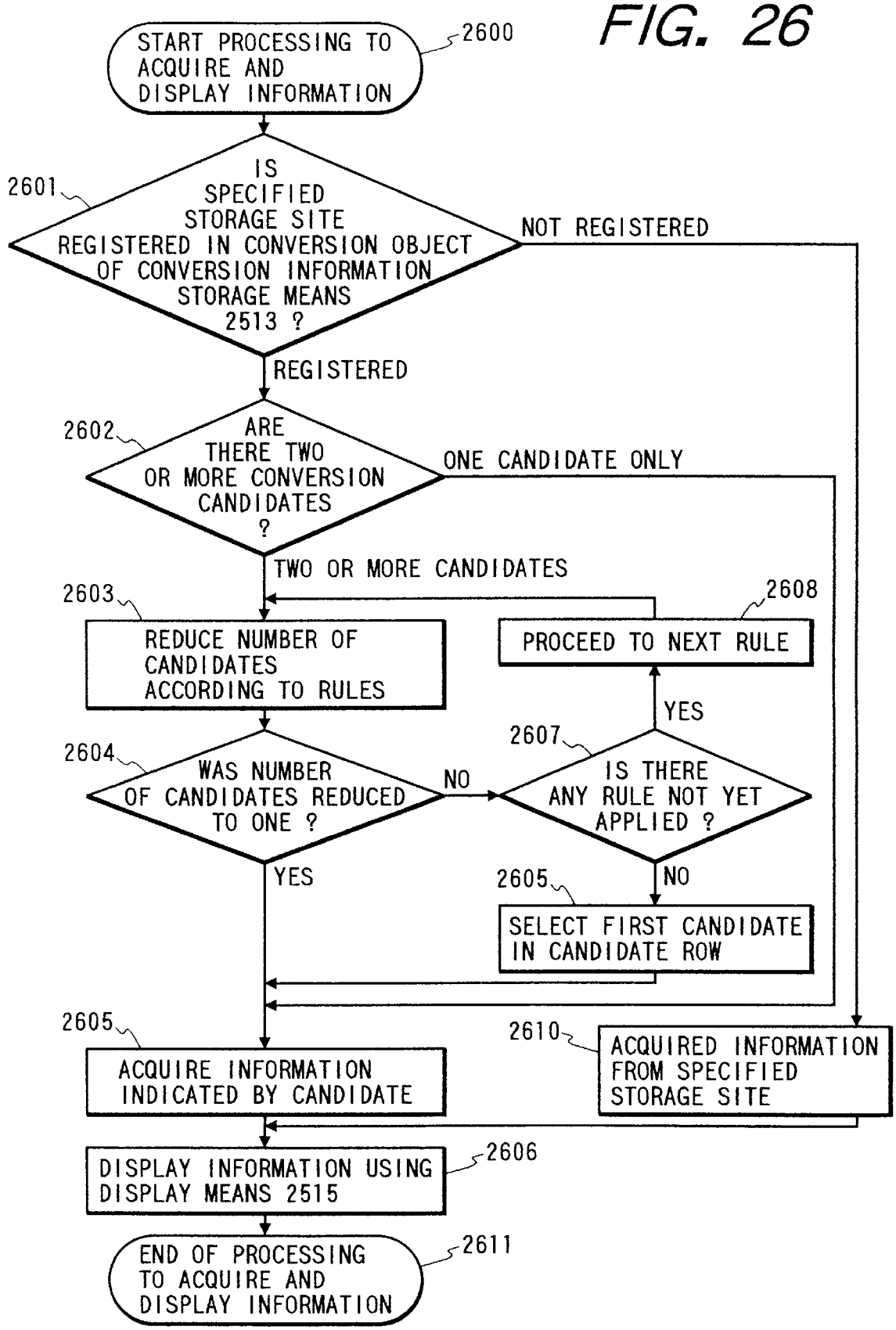
FIG. 26 is a flow chart showing flow of processing of an information providing system in the twelfth embodiment of the present invention.
Figure 27:
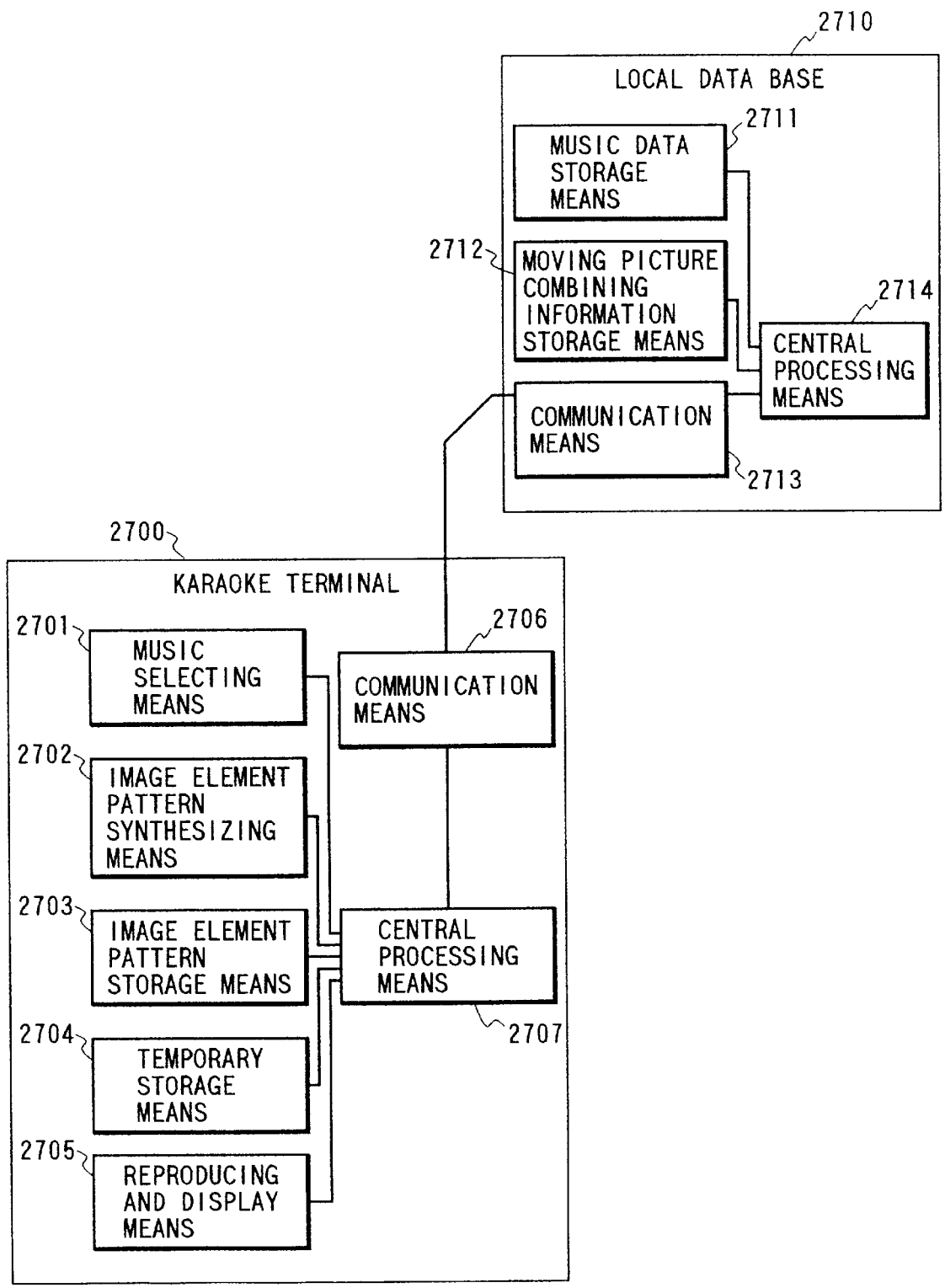
FIG. 27 is a schematical block diagram of a karaoke system.
Figure 28:
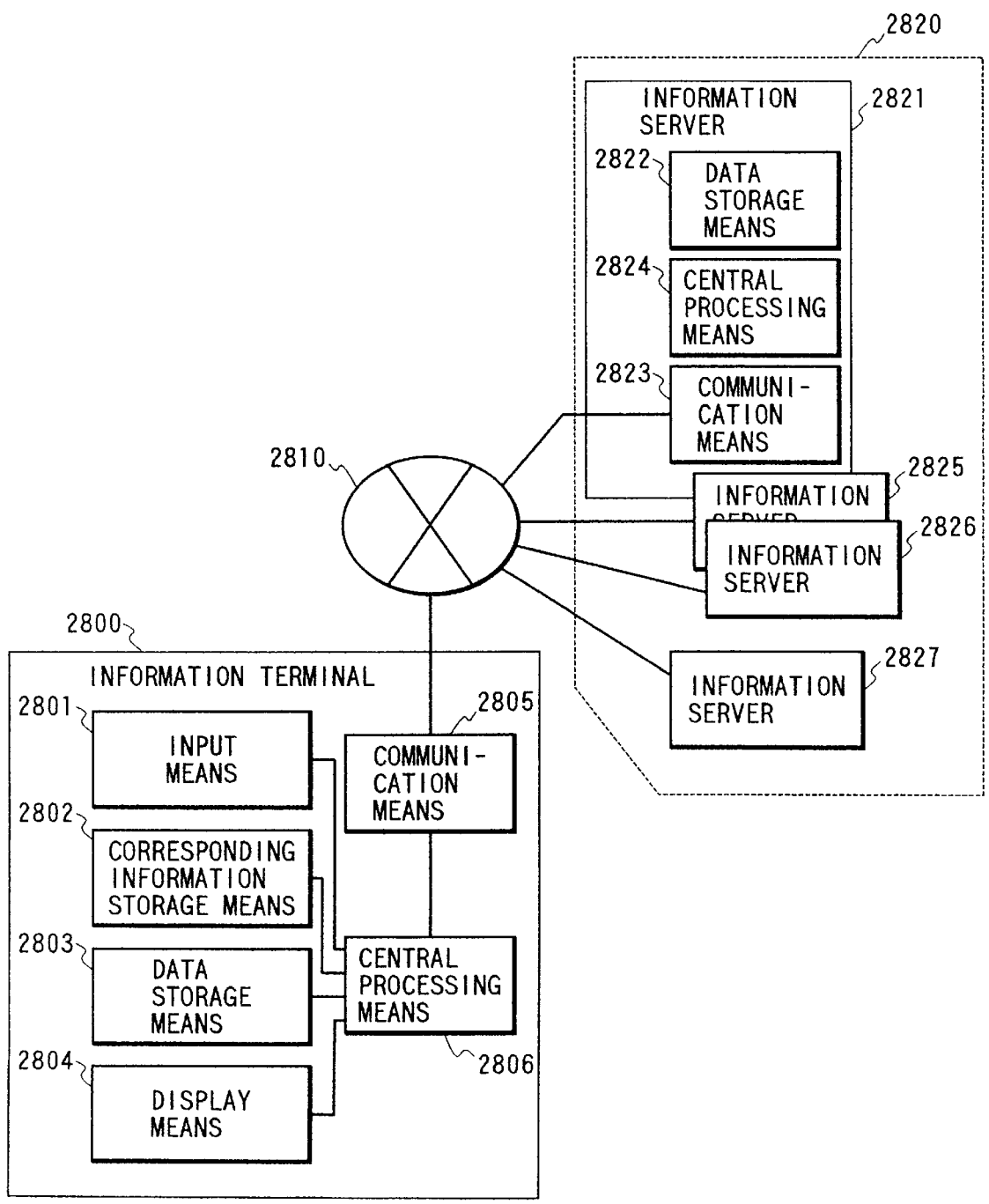
FIG. 28 is a schematical block diagram of a cash utilization system.

FIG. 26 is a flow chart showing the flow of processing in an information providing system in the twelfth embodiment of the present invention.

Table 17 represents an example of content stored in the conversion information storage means 2013 in case there are two or more conversion candidates.

TABLE 17

| Conversion information | |
|---|---|
| Conversion object address | Conversion candidate address |
| http://remotehost/A | file:///#000001/data/A |
| | file:///#000002/data/B |
| http://remotehost/C | file:///#000002/data/C |
| | file:///#000003/data/D |
| http://remotehost/E | http://nearhost1/E |
| | http://nearhost2/F |
| | http://nearhost3/G |
| ... | ... |

Table 18 shows an example of selection rule, to which the candidate selection means 2514 refers.

TABLE 18

| Rule No. | Contents |
|---|---|
| 1 | What is present in portable storage medium currently in drive |
| 2 | What is present in portable storage medium most recently in drive |
| 3 | What can be displayed most quickly |
| ... | ... |

In the following, description will be given on the flow of processing in the present embodiment referring to FIG. 25 and FIG. 26.

When the user specifies storage site of a certain information using the input means, the control means 2517 starts the processing to acquire and display the information (2600).

The control means 2517 checks whether the specified storage site is registered as conversion object in the conversion information storage means 2513 (2601). If it is registered, it is checked whether there are two or more conversion candidates to the conversion object (2602).

If there are two or more candidates, the control means 2517 calls the candidate selecting means 2514 to select the candidates, and the candidate selecting means 2514 selects the candidate using the first of the rules given in Table 18 (2603).

After applying the rule, the candidate selecting means 2514 evaluates number of the candidates, which satisfy the condition (2604). If one candidate is selected, it is notified to the control means 2517 that the selection of candidates has been completed and which one is the selected candidate.

The control means 2517 acquires the information indicated by the selected candidate, i.e. if the information is an information of DVD-ROM 2501, an entity of information 2503 of the DVD-ROM 2501 is acquired using the DVD-ROM drive 2516 (2605) and displays the entity of information 2503 using the display means 2515 (2606), and the processing to acquire and display the information is terminated (2611).

In Step 2601, if the storage site specified by the input means 2511 is not registered as conversion object in the conversion information storage means 2513, the information is acquired from the specified storage site (2610) and is displayed (2606), and the processing to acquire and display the information is terminated (2611).

In Step 2602, if there is only one conversion candidate to the conversion object, the control means 2517 does not call the candidate selecting means, acquires the information indicated by the candidate (2605) and displays it (2606), and the processing to acquire and display the information is terminated (2611).

In Step 2604, if the number of the candidates cannot be reduced to one even when the rule is applied, it is checked whether there is any rules or not, which have not been applied (2607). If there are rules not yet applied, the rules are selected one after another according to a predetermined order (2608), and the number of candidates is reduced reduced (2603). On the other hand, if there is no more rule to be applied, the candidate selecting means 2514 indicates the information that selection of candidates has failed with the currently applicable rule and notifies the first candidate in the candidate row as the selected candidate to the control means 2517 (2609). Upon receipt of the result, the control means 2517 acquires the information indicated by the candidate (2605) and displays it (2606), and the processing to acquire and display the information is terminated (2611).

To facilitate explanation, the rules written in the column of the content are applied in the ascending order as shown in Table 18 as corresponding to the rules described in Steps 2603, 2604, 2607 and 2608 of FIG. 26. However, neither the order of application nor the content of the rules applied is limited to this, and a method to select other information may be used.

In case there are applicable conditions as given in Table 1, selection according to the selection rule may be performed after checking whether or not there are some, which satisfies the applicable conditions.

It is needless to say that the same effect can be obtained in a system explained in the second embodiment, i.e. in a system where "conversion is not carried out immediately after the information is specified from the user, and the information as specified is acquired first, and in case the information is a script, conversion is carried out".

In the present embodiment, DVD-ROM is used as the portable storage medium, while it is not limited to this, and any type of portable storage medium such as floppy disk, CD-ROM, or MO may be used regardless of whether it is of read-only type or of rewritable type.

As the driving means for the portable storage medium, DVD-ROM drive is used, while it is not limited to this, and any means for driving a medium corresponding to the above portable storage medium such as floppy disk drive, CD-ROM drive or MO drive may be used.

As described above, it is possible according to the present embodiment that the candidate selecting means can select candidates according to a plurality of rules in case there are two or more conversion candidates and can select and display an adequate candidate depending on circumstances. Thus, the effects in practical application are enormous.

The information providing system according to the present invention can describe any corresponding relation to conversion information.

Even in a system not connected with the network, the information providing system of the present invention can accept the request to an information present in other information server so far as the conversion information corresponds to it, and the corresponding information entity can be read from the portable storage medium and can be provided.

In the information providing system of the present invention, the media-identifying information and the conversion information are utilized by connecting with each other, and it is unlikely to occur that other file having similar path is referred. In case an adequate drive is not connected, the system can instruct the user to connect an adequate drive, or in case an adequate portable storage medium is not in the drive, the system can instruct the user to put an adequate portable storage medium.

It is also possible to prevent illegitimate use of the information distributed by a certain storage medium, e.g. optical disk, by copying it on another storage medium, e.g. a hard disk, and by illegitimately using it. If it is designed in such manner that the information written in an area where only the provider of the storage medium can write is used as the media-identifying information, it is possible to prevent illegitimate use by reproduction even when it is the storage medium of the same type.

When provided with the updated information address in the portable storage medium for distributing the conversion information and information entity, the information providing system can automatically acquire the newest conversion information for the information server via the network.

In case the conversion information is updated later by the portable storage medium, it is determined whether information should be determined or not based on the application media-identifying information of the portable storage medium, and when the corresponding information entity is not at hand of the user, it does not occur that only the conversion information is registered.

If there are two or more candidates to the conversion object, an adequate candidate can be selected.

By converting the script sent from the information server, it is possible, to a request to a certain information at the information server, to combine a plurality of information in a local portable storage medium and to present it, to combine a local information with a remote information and to present it, or to read a related information from a local portable storage medium, while the remote information is being acquired and to present it.

If a mode to uniquely identify a resource on Internet such as uniform resource names ("URN") is used to indicate storage site of information, it is possible to reduce burden of the provider of conversion information or of updated information address.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An information providing system, at least comprising:

conversion information storage means for storing conversion information indicating a conversion object address expressing storage status of given information, which is to be a conversion object, a conversion candidate address expressing storage status of information corresponding to said given information, and a conversion relationship between said two addresses;

input means for accepting designation of an arbitrary address and input of instruction;

display/output means for displaying and/or outputting arbitrary information; and control means for controlling said input means, said conversion information storage means and said display/output means;

wherein, in case the conversion object address corresponding to the address specified by said input means is stored in said conversion information storage means, an entity of information indicated by the conversion candidate address corresponding to the conversion object address stored in said conversion information storage means is delivered to said display/output means at the instruction of said control means.

2. An information providing system, at least comprising:

conversion information storage means for storing conversion information indicating a conversion object script, which is at least a part of a description of a given script, a conversion candidate script corresponding to said conversion object script, and conversion relationship between said two scripts;

input means for accepting designation of an arbitrary address or input of instruction;

display/output means for displaying and/or outputting an arbitrary information; and control means for controlling said input means, said conversion information storage means and said display/output means;

wherein, when at least a part of description of the script indicated by the address specified by said input means is stored as a conversion script in said conversion information storage means;

the conversion object script stored in said conversion information storage means is converted to a conversion candidate script indicated by the address specified by said input means, and an entity of information indicated by the script obtained by said conversion is delivered to said display/output means.

3. An information providing system according to claim 1 or 2, wherein:

there is further provided communication means for transmitting and receiving information via a network;

a conversion information is acquired using said communication means from an information server, which is present on the network and can provide information via said network at the instruction of the control means; and said conversion information is stored in the conversion information storage means.

4. An information providing system according to claim 1 or 2, wherein:
    said system comprises a storage medium where the conversion information is recorded;
    there is further provided storage medium driving means for reading data from or reading/writing data from or to said storage medium; and
    a conversion information is read using the storage medium driving means from said storage medium at the instruction of the control means; and
    said conversion information is stored in the conversion information storage means.

5. An information providing system according to claim 4, wherein said storage medium is of portable type.

6. An information providing system according to claim 5, wherein:
    in addition to the conversion information, at least a media-identifying information for uniquely determining type and content of the portable storage medium where said conversion information is recorded is recorded in said portable storage medium;
    there is further provided media-identifying information storage means for storing the media-identifying information of said portable storage medium; and
    the media-identifying information of the portable storage medium set in the storage medium driving means is stored in said media-identifying information storage means at the instruction of the control means.

7. An information providing system according to claim 1 or 2, wherein:
    the storage site of the conversion candidate indicated by the conversion candidate address of claim 1, or
    the storage site described in the conversion candidate script of claim 2 is expressed in such manner that it is possible to determine whether it is an information server on the network or a local storage medium.

8. An information providing system according to claim 1, wherein:
    the media-identifying information for uniquely determining type and content of the portable storage medium is at least recorded on said portable storage medium;
    there are further provided portable storage medium driving means for reading data from or for reading/writing data from or to said portable storage medium; and
    media-identifying information storage means for storing the media-identifying information of said portable storage medium set in said portable storage medium driving means; and
    the storage site of the conversion candidate indicated by the conversion candidate address is expressed in such manner that it is possible to judge whether it possesses the media-identifying information stored in said media-identifying information storage means.

9. An information providing system according to claim 2, wherein:
    the media-identifying information for uniquely determining type and content of the portable storage medium is at least recorded on said portable storage medium; and
    there are further provided portable storage medium driving means for reading data from or for reading/writing data from or to said portable storage medium; and
    media-identifying information storage means for storing the media-identifying information of said portable storage medium set in said portable storage medium driving means; and
    the storage site described in the conversion candidate script has the media-identifying information stored in said media-identifying information storage means.

10. An information providing system according to claim 6, wherein:
    it is possible to judge as to from which portable storage medium the conversion information stored in the conversion information storage means has been obtained.

11. An information providing system according to claim 1, wherein:
    in case it is expressed that the storage site of the conversion candidate indicated by the conversion candidate address is a portable storage medium;
    a media-identifying information for uniquely determining type and content of the portable storage medium is at least recorded in said portable storage medium;
    there are further provided portable storage medium driving means for reading data from or for reading/writing data from or to said portable storage medium; and
    media-identifying information storage means for storing media-identifying information of said portable storage medium set in said portable storage medium driving means; and
    said storage site is replaced with a type for uniquely specifying the driving site of said portable storage medium in the system.

12. An information providing system according to claim 2, wherein:
    in case it is indicated that the storage site described in the conversion candidate script is a portable storage medium;
    a media-identifying information for uniquely determining type and content of the portable storage medium is at least recorded on said portable storage medium;
    there are further provided portable storage medium driving means for reading data from or for reading/writing data from or to said portable storage medium; and
    media-identifying information storage means for storing media-identifying information of said portable storage medium set in said portable storage medium driving means; and
    said storage site is replaced with a type for uniquely specifying the driving site of said portable storage medium in the system.

13. An information providing system according to claim 11 or 12, wherein:
    there is further provided driving site storage means for storing the driving site of said storage medium driving means in relation to the media-identifying information of said portable storage medium; and
    the media-identifying information of the portable storage medium set in said storage medium driving means is replaced with said driving site.

14. An information providing system according to claim 1 or 2, wherein:
    an updated information address for indicating storage status of the most up-to-date and/or additional information of the conversion information is at least recorded on the portable storage medium;
    there is further provided communication means for transmitting and receiving information via the network;

the updated conversion information present on the network and in the information server capable to provide information via said network is acquired using said communication means based on the updated information address recorded on said portable storage medium; and the conversion information stored in said conversion information storage means is updated in accordance with said updated conversion information.

15. An information providing system according to claim 14, wherein there is further provided updated information address storage means for storing updated information address.

16. An information providing system according to claim 14, wherein:

the information server maintains updated version information relating to a version of said updated conversion information together with the updated conversion information;

there is further provided version information storage means for storing version information, which is an information relating to the version of the conversion information stored in the conversion information storage means;

the updated version information maintained by said information server is acquired using the communication means at the instruction of the control means; and said conversion information is updated by comparing said acquired updated version information with the version information of the conversion information stored in said version information storage means.

17. An information providing system according to claim 6, wherein:

from the updated information storage medium where at least the updated conversion information, i.e. the most up-to-date and/or additional information of the conversion information stored in the conversion information storage means; and an application media-identifying information for uniquely determining type and content of the portable storage medium, from which said conversion information has been acquired;

said application media-identifying information is read using the storage medium driving means at the instruction of the control means; and in case said application media-identifying information thus read is stored in the media-identifying information storage means as media-identifying information;

among the conversion information stored in the conversion information storage means, the conversion information corresponding to said application media-identifying information is updated.

18. An information providing system according to claim 17, wherein:

an updated version information, i.e. an information relating to a version of said updated information conversion is further recorded on the updated information storage medium in addition to the updated information conversion and the application media-identifying information;

there is further provided version information storage means for storing the information relating to a version of the conversion information stored in the conversion information storage means; and in case said application media-identifying information is stored in the media-identifying information storage means as media-identifying information;

the updated version information recorded in said updated information recording medium is read using the storage medium driving means at the instruction of the control means; and said conversion information is updated by comparing said read updated version information with the version information of the conversion information stored in said version information storage means and corresponding to said application media-identifying information.

19. An information providing system according to claim 1 or 2, wherein, in case there are two or more conversion candidates to one conversion object, there is further provided candidate selecting means for selecting conversion candidate from said two or more conversion candidates, storage medium driving means for reading data from or for reading/writing data from or to said portable storage medium and media-identifying information storage means for storing media-identifying information of said portable storage medium set in said portable storage medium driving means, and said storage site is replaced by a type for uniquely specifying the driving site of said portable storage medium in the system, whereby:

the storage site of conversion candidate in the portable storage medium when it is distributed is expressed in the type not including the drive name in the system which user utilizes, by acquiring a driving name for uniquely specifying the storage site of the portable storage medium in the system, if the corresponding portable storage medium is not set in the drive, message is issued to call special attention so that it is set to the corresponding drive.

* * * * *